United States Patent
McCall et al.

(10) Patent No.: US 6,611,170 B2
(45) Date of Patent: Aug. 26, 2003

(54) ANGULAR RATE AMPLIFIER WITH NOISE SHIELD TECHNOLOGY

(75) Inventors: Hiram McCall, Simi Valley, CA (US); Ching-Fang Lin, Simi Valley, CA (US)

(73) Assignee: American GNC Corporation, Simi Valley, CA (US)

( * ) Notice: Subject to any disclaimer, the term of this patent is extended or adjusted under 35 U.S.C. 154(b) by 108 days.

(21) Appl. No.: 09/783,240

(22) Filed: Feb. 13, 2001

(65) Prior Publication Data

US 2002/0135420 A1 Sep. 26, 2002

(51) Int. Cl.$^7$ ................................................ H03F 1/00
(52) U.S. Cl. ............................................................ 330/68
(58) Field of Search .............................. 73/488; 330/65, 330/66, 68; 361/748

(56) References Cited

U.S. PATENT DOCUMENTS 4,654,636 A * 3/1987 Rusk ....................... 324/175 X

* cited by examiner

*Primary Examiner*—Steven J. Mottola
(74) *Attorney, Agent, or Firm*—Raymond Y. Chan; David and Raymond Patent Group

(57) ABSTRACT

An angular rate amplifier, which is adapted to amplify useful signals, which are proportional to rotation motion of a carrier, and to suppress noise, which is not proportional to rotation motion of a carrier, in output signals from an angular rate producer, including a MEMS (MicroElectronicMechanicalSystem) angular rate sensor. Compared with a conventional amplifiers, a noise shield and a co-resident trans impedance amplifier are utilized to achieve high signal/noise ratio. Furthermore, the angular rate producer and the noise shield and a co-resident trans impedance amplifier are used in a micro inertial measurement unit (IMU) to improve performance of the micro inertial measurement unit to form highly accurate, digital angular increments, velocity increments, position, velocity, attitude, and heading measurements of a carrier under dynamic environments.

2 Claims, 31 Drawing Sheets

ANGULAR RATE AMPLIFIER WITH NOISE SHIELD TECHNOLOGY

BACKGROUND OF THE PRESENT INVENTION

1. Field of the Present Invention

The present invention relates to an amplifier, and more particularly to an angular rate amplifier that can maximize the useful signal and minimize noise in the output signals of an angular rate producer to achieve high signal/noise ratio.

2. Description of Related Arts

Generally, at their origin, the original output signals of a sensor are very weak and contain useful signals and various types of noise. An amplifier is employed to amplify the output signal of the sensor. There are various types of conventional amplifiers, including:

(1) Feedback amplifiers.

With feedback concept in the design of amplifiers, a number of advantages can be obtainable, such as gain desensitivity, bandwidth extension, reduction of nonlinear distortion, and input and output impedance control.

(2) Differential amplifiers.

A differential amplifier is design to amplify the difference between two signals.

(3) Operational amplifiers.

The operational amplifier (commonly call an "op-amp") is a fundamental building block in analog integrated circuit (IC) design, which is actually a very high gain, dc coupled differential amplifier. Op-amps typically have very high input impedance, voltage gains of at least several hundred thousand, and very low dc offset. An op-amp itself is nearly useless. However, op-amps, as building blocks, are to provide a high gain device for use in a feedback circuit. The function of the circuit with op-amp and feedback components depends on the configuration of the feedback components.

(4) Trans impedance amplifiers.

A trans impedance amplifier is selected for use in applications where a signal takes the form of a variation in current. This type of signal is found in a system that has a very large output impedance.

The challenge for design of an amplifier is that the amplifier should amplify the useful signal and suppress the noise of the output signal of the sensors. Therefore, an amplifier should be optimized for a specific sensor to achieve that purpose.

SUMMARY OF THE PRESENT INVENTION

The main objective of the present invention is to provide an amplifier for an angular rate producer including a MEMS (MicroElectronicMechanicalSystem) angular rate sensor, which can maximize the useful signal and minimize noise in the output signals of an angular rate producer to achieve high signal/noise ratio, so that the signal/noise ratio is much larger than one.

Another objective of the present invention is to provide an amplifier for an angular rate producer including a MEMS (MicroElectronicMechanicalSystem) angular rate sensor, wherein a noise shield is adapted to maximize the useful signal and minimize noise in the output signals of an angular rate producer to achieve high signal/noise ratio.

Another objective of the present invention is to provide an amplifier for an angular rate producer including a MEMS (MicroElectronicMechanicalSystem) angular rate sensor, wherein a co-resident trans impedance amplifier is adapted to maximize the useful signal and minimize noise in the output signals of an angular rate producer to achieve high signal/noise ratio.

Another objective of the present invention is to provide an amplifier for an angular rate producer including a MEMS (MicroElectronicMechanicalSystem) angular rate sensor, wherein a noise shield is co-operated with a co-resident trans impedance amplifier to maximize the useful signal and minimize noise in the output signals of an angular rate producer to achieve high signal/noise ratio.

Another objective of the present invention is to provide an amplifier for an angular rate producer including a MEMS (MicroElectronicMechanicalSystem) angular rate sensor, wherein the angular rate producer and the noise shield and a co-resident trans impedance amplifier are used in a micro inertial measurement unit (IMU) to improve performance of the micro inertial measurement unit to produce highly accurate, digital angular increments, velocity increments, position, velocity, attitude, and heading measurements of a carrier under dynamic environments.

DETAIL DESCRIPTION OF THE PREFERRED EMBODIMENT

Figure 1:
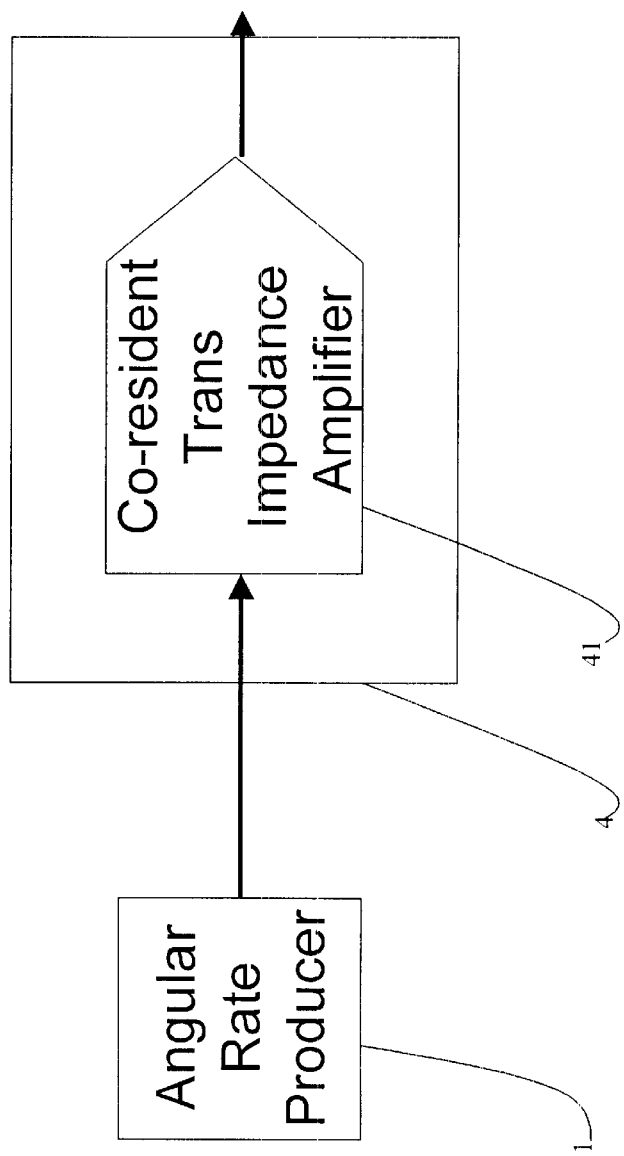
FIG. 1 is a block diagram illustrating the amplifier of the first preferred embodiment of the present invention.

Today, broad and diverse sensors or sensor arrays are available to measure almost any conceivable physical quantity. Output signals of a fairly typical sensor or transducer, such as optoelectronic sensors, mechanical sensors, thermal sensors, and magnetic sensors, etc., can be expressed as Output signals=useful signals+noises The noise sources are:
(i) Resistance noise.
(ii) Random electromagnetic energy received by the circuit connection, serving as a small antenna.

An amplifier is a device generally implemented by an analog circuit, which is designed to increases the voltage, current, or power of an electric signal. Amplifiers are commonly used in sensor based systems, wireless communications and broadcasting, and in audio equipment of all kinds. According to amplifier functions and objectives, most is amplifiers can be categorized as weak (small) signal amplifiers and power amplifiers.

A weak signal amplifier is designed to handle exceedingly small input signals, in some cases measuring only a few nanovolts (units of $10^{-9}$ volt). Weak signal amplifiers are used primarily in sensor systems and communications. For example, they are also employed in acoustic pickups, audio tape players, and compact disc players. A weak signal amplifier must minimize internal noise while increasing the signal voltage by a large factor. Typically, small variations in the input voltage of the weak signal amplifier produce corresponding, but much larger, variations in output voltage of the weak signal amplifier. The ratio of these voltage changes is called the amplification factor. The most effective device for this amplifier application is the field-effect transistor. The most important specification that denotes the effectiveness of a weak signal amplifier is sensitivity, which is defined as the number of microvolts (units of $10^{-6}$ volt) of signal input that produces a certain ratio of signal output to noise output (usually 10 to 1). The weak signal amplifier can be a single-stage amplifier. However, when greater amplification is required than it is possible with one stage of amplification, a multistage amplifier is arranged to achieve the required amplification factor.

A power amplifier is intended to accurately increase the power level of an electronic signals to drive a load, such as a speaker. It should be accurate in every aspect, without adding distortion or noise. Power amplifiers are used in wireless transmitters, broadcast transmitters, and high fidelity audio equipment. The most frequently used device to achieve power amplification is the bipolar transistor. However, vacuum tubes, once considered obsolete, are becoming increasingly popular, especially among musicians. Many professional musicians believe that the vacuum tube provides superior fidelity.

Two important considerations in power amplification are:
(i) Power output. Power output is measured in watts or kilowatts
(ii) Efficiency. Efficiency is the ratio of signal power output to total power input (wattage demanded of the power supply or battery). This value is always less than 1.

It is typically expressed as a percentage. In audio applications, power amplifiers are 30 to 50 percent efficient.

In wireless communications and broadcasting transmitters, efficiency ranges from about 50 to 70 percent.

In high fidelity audio power amplifiers, distortion is also an important factor. This is a measure of the extent to which the output waveform is a faithful replication of the input waveform. The lower the distortion, in general, the better the fidelity of the output sound.

Amplifiers with low noise characteristics are critical to a sensor system. The amplifier of the present invention is type of weak signal amplifiers.

In the present invention, the amplifier of the present invention is preferred to be used for MEMS angular rate sensors, but not limited to the MEMS angular rate sensor. The amplifier of the present invention can be used for other sensors.

Referring to FIG. 1, the angular rate amplifier 4 of the present invention for an angular producer 1 comprises a co-resident trans impedance amplifier 41 to maximize the useful signal and minimize noise in the output signals of the angular rate producer 1 to achieve high signal/noise ratio.

The co-resident trans impedance amplifier 41 is located as close as possible to the output pin of the angular rate amplifier 1, so that any noise that enters the connection between the angular rate producer 1 and the co-resident trans impedance amplifier 4 can be reduced.

Figure 2:
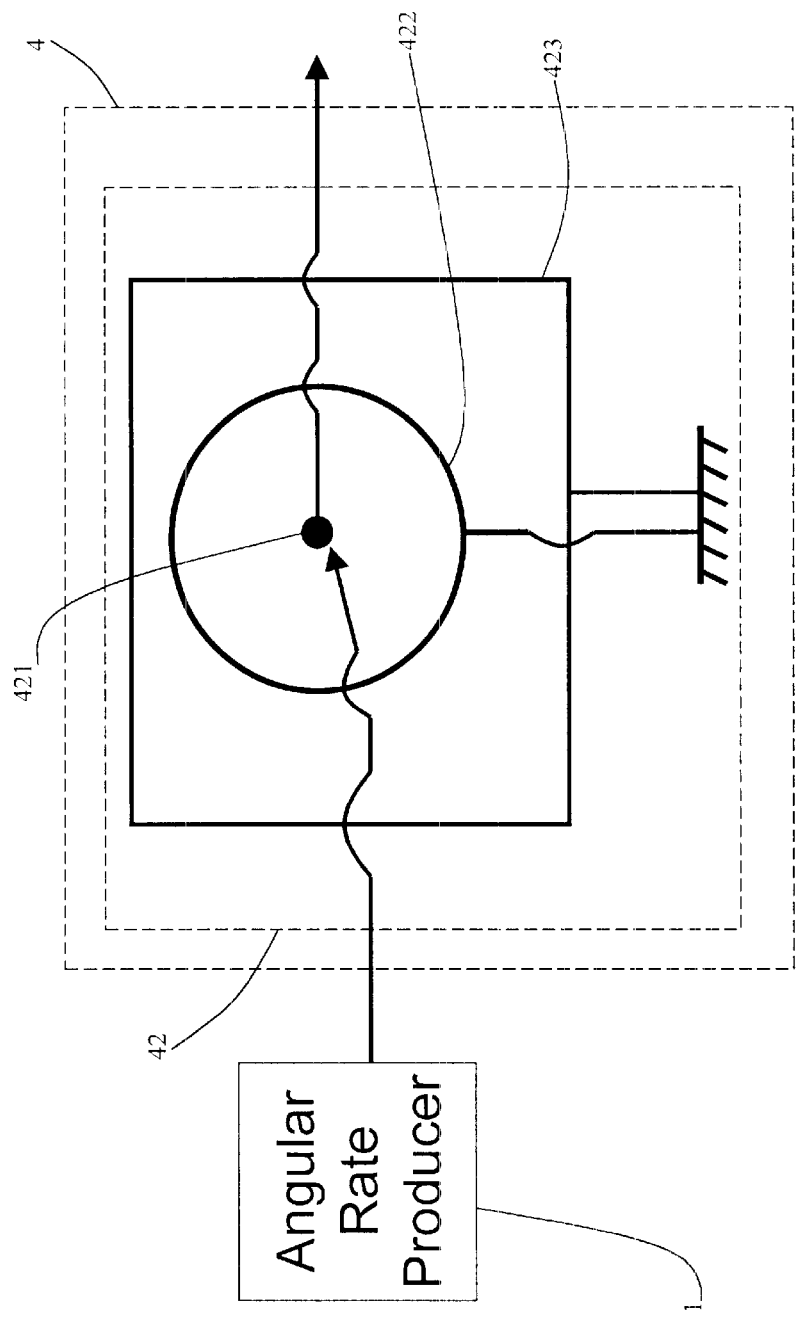
FIG. 2 is a block diagram illustrating the amplifier of the second preferred embodiment of the present invention.

Referring to FIG. 2, the angular rate amplifier 4 of the present invention for an angular rate producer 1 comprises a noise shield 42. The noise shield 42 can be designed on a PCB (Printed circuit Board).

The noise shield 42 further comprises:
- a central pin 421, connected to the output pin of the angular rate producer 1 and user of the angular rate producer 1 to carry the output signal of the angular rate producer 1;
- a guard hole 422, connected with the ground plane of the PCB, to prevent any external noises and interference from being input into the output signal of the angular rate producer 1;
- a guard hat 423, connected with the ground plane of the PCB, for surrounding the central pin 421 and guard hole 422 to further prevent noises and interference from being input into the output signal of the angular rate producer 1.

Figure 3:
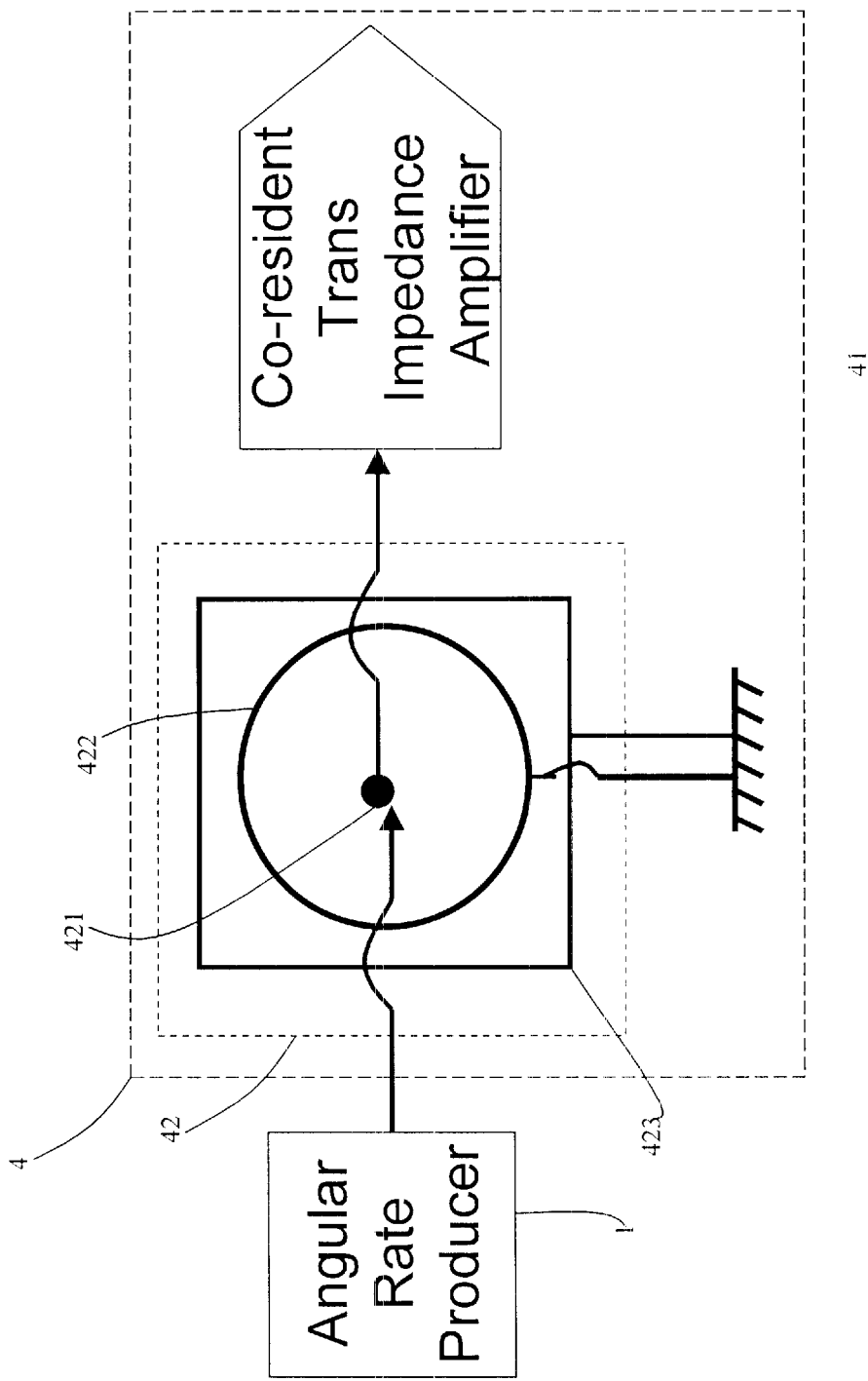
FIG. 3 is a block diagram illustrating the amplifier of third preferred embodiment of the present invention.

Referring to FIG. 3, the angular rate amplifier 4 of the present invention for an angular rate producer 1 comprises a noise shield 42, placed between the output pin of the angular rate producer 1 and the co-resident trans impedance amplifier 41, to prevent any external noises and interference from being input into the output signal of the angular rate producer 1. The noise shield can be designed on a PCB (Printed circuit Board). The noise shield 41 further comprises a central pin 421 surrounded by a guard hole 422 and guard hat 423. One end of the central pin 421 is connected with an output pin of the angular rate producer 1 and the other end of the central pin 421 is connected with the input point of the co-resident trans impedance amplifier 41. The guard hole 422 is connected with the ground plane of the PCB to prevent any external noises and interference from being input into the output signal of the angular rate producer 1. The guard hat 423, connected with the ground plane of the PCB, is used to surround the central pin 421 and guard hole 422 to further prevent noises and interference from being input into the output signal of the angular rate producer 1.

A co-resident trans impedance amplifier 41, connected with the central pin 421 of the noise shield 42 to further amplify the useful signals.

A trans impedance amplifier is selected for use in applications where a signal takes the form of a variation in current. This type of signal is found in a system that has a very large output impedance.

Rather than attempting to match amplifier input impedance with the system output impedance, the trans impedance amplifier is selected. It has an input impedance very close to zero, so that it detects only changes in current.

The use of such an amplifier results in less sensitivity to unwanted signals that are capacitively coupled into the input signal. Because these signals tend to be higher frequency, this amplifier has a higher rejection capability.

The magnetically coupled noise signals generally provide less power as the frequency increases, and very little power at, lower frequencies.

Therefore, the trans impedance amplifier is best utilized with a shield from signals coupled through electric fields.

The noise shield 42 of operation concept is created based on the following facts:
(i) An electric field found within the Faraday cavity is lamaller without curl i.e. the total charge is found within the closed surface.
(ii) Electric fields present at the source of a trans impedance amplifier are minimal due to the small voltages present.

In case of MEMS angular rate producer, the output signals of the MEMS angular rate producer are catalogued to two types:
1) angular motion-induced signals, including rate displacement signals which may be modulated carrier reference oscillation signals; and
2) its inertial element dither motion signals, including dither displacement signals.

Therefore, two sets of amplifier of the present invention need to be adapted with MEMS angular rate producer.

The angular rate amplifier of the present invention can be further applied to a micro Inertial Measurement Unit (IMU) to achieve an improved performance of the IMU. The micro IMU with the angular rate amplifier of the present invention is disclosed as follows.

Generally, an inertial measurement unit (IMU) is employed to determine the motion of a carrier. In principle, an inertial measurement unit relies on three orthogonally mounted inertial angular rate producers and three orthogonally mounted acceleration producers to obtain three-axis angular rate and acceleration measurement signals. The three orthogonally mounted inertial angular rate producers and three orthogonally mounted acceleration producers with additional supporting mechanical structure and electronic devices are conventionally called an Inertial Measurement Unit (IMU). The conventional IMUs may be cataloged into Platform IMU and Strapdown IMU.

In the platform IMU, angular rate producers and acceleration producers are installed on a stabilized platform. Attitude measurements can be directly picked off from the platform structure. But attitude rate measurements can not be directly obtained from the platform. Moreover, there are highly accurate feedback control loops associated with the platform.

Compared with the platform IMU, in the strapdown IMU, angular rate producers and acceleration producers are directly strapped down with the carrier and move with the carrier. The output signals of the strapdown rate producers and acceleration producers are expressed in the carrier body frame. The attitude and attitude rate measurements can be obtained by means of a series of computations.

A conventional IMU uses a variety of inertial angular rate producers and acceleration producers. Conventional inertial angular rate producers include iron spinning wheel gyros and optical gyros, such as Floated Integrating Gyros (FIG), Dynamically Tuned Gyros (DTG), Ring Laser Gyros (RLG), Fiber-Optic Gyros (FOG), Electrostatic Gyros (ESG), Josephson Junction Gyros (JJG), Hemisperical Resonating Gyros (HRG), etc. Conventional acceleration producers include Pulsed Integrating Pendulous Accelerometer (PIPA), Pendulous Integrating Gyro Accelerometer (PIGA), etc.

The processing method, mechanical supporting structures, and electronic circuitry of conventional IMUs vary with the type of gyros and accelerometers employed in the IMUs. Because conventional gyros and accelerometers have a large size, high power consumption, and moving mass, complex feedback control loops are required to obtain stable motion measurements. For example, dynamic-tuned gyros and accelerometers need force-rebalance loops to create a moving mass idle position. There are often pulse modulation force-rebalance circuits associated with dynamic-tuned gyros and accelerometer based IMUs. Therefore, conventional IMUs commonly have the following features:

(a) High cost,
(b) Large bulk (volume, mass, large weight),
(c) High power consumption,
(d) Limited lifetime, and
(e) Long turn-on time.

These present deficiencies of conventional IMUs prohibit them from use in the emerging commercial applications, such as phased array antennas for mobile communications, automotive navigation, and handheld equipment.

New horizons are opening up for inertial sensor device technologies. MEMS (MicroElectronicMechanicalSystem) inertial sensors offer tremendous cost, size, and reliability improvements for guidance, navigation, and control systems, compared with conventional inertial sensors.

MEMS, or, as stated more simply, micromachines, are considered as the next logical step in the silicon revolution. It is believed that this coming step will be different, and more important than simply packing more transistors onto silicon. The hallmark of the next thirty years of the silicon revolution will be the incorporation of new types of functionality onto the chip structures, which will enable the chip to, not only think, but to sense, act, and communicate as well.

Prolific MEMS angular rate sensor approaches have been developed to meet the need for inexpensive yet reliable angular rate sensors in fields ranging from automotive to consumer electronics. Single input axis MEMS angular rate sensors are based on either translational resonance, such as tuning forks, or structural mode resonance, such as vibrating rings. Moreover, dual input axis MEMS angular rate sensors may be based on angular resonance of a rotating rigid rotor suspended by torsional springs. Current MEMS angular rate sensors are primarily based on an electronically-driven tuning fork method.

More accurate MEMS accelerometers are the force rebalance type that use closed-loop capacitive sensing and electrostatic forcing. Draper's micromechanical accelerometer is a typical example, where the accelerometer is a monolithic silicon structure consisting of a torsional pendulum with capacitive readout and electrostatic torquer. Analog Device's MEMS accelerometer has an integrated polysilicon capacitive structure fabricated with on-chip BiMOS process to include a precision voltage reference, local oscillators, amplifiers, demodulators, force rebalance loop and self-test functions.

Although the MEMS angular rate sensors and MEMS accelerometers are available commercially and have achieved micro chip-size and low power consumption, however, there is not yet available high performance, small size, and low power consumption IMUs.

Currently, MEMS exploits the existing microelectronics infrastructure to create complex machines with micron feature sizes. These machines can have many functions, including sensing, communication, and actuation. Extensive applications for these devices exist in a wide variety of commercial systems.

The difficulties for building a micro IMU is the achievement of the following hallmark using existing low cost and low accuracy angular rate sensors and accelerometers:

(a) Low cost,
(b) Micro size
(c) Lightweight
(d) Low power consumption
(e) No wear/extended lifetime
(f) Instant turn-on
(g) Large dynamic range
(h) High sensitivity
(i) High stability
(j) High accuracy To achieve the high degree of performance mentioned above, a number of problems needs to be addressed:

(1) Micro-size angular rate sensors and accelerometers need to be obtained. Currently, the best candidate angular rate sensor and accelerometer to meet the micro size are MEMS angular rate sensors and MEMS accelerometers.
(2) Associated mechanical structures need to be designed.
(3) Associated electronic circuitry needs to be designed.
(4) Associated thermal requirements design need to be met to compensate the MEMS sensor's thermal effects.
(5) The size and power of the associated electronic circuitry needs to be reduced.

The micro inertial measurement unit of the present invention is preferred to employ with the angular rate producer, such as MEMS angular rate device array or gyro array, that provides three-axis angular rate measurement signals of a carrier, and the acceleration producer, such as MEMS acceleration device array or accelerometer array, that provides three-axis acceleration measurement signals of the carrier, wherein the motion measurements of the carrier, such as attitude and heading angles, are achieved by means of processing procedures of the three-axis angular rate measurement signals from the angular rate producer and the three-axis, acceleration measurement signals from the acceleration producer.

In the present invention, output signals of the angular rate producer and acceleration producer are processed to obtain digital highly accurate angular rate increment and velocity increment measurements of the carrier, and are further processed to obtain highly accurate position, velocity, attitude and heading measurements of the carrier under dynamic environments.

Figure 4:
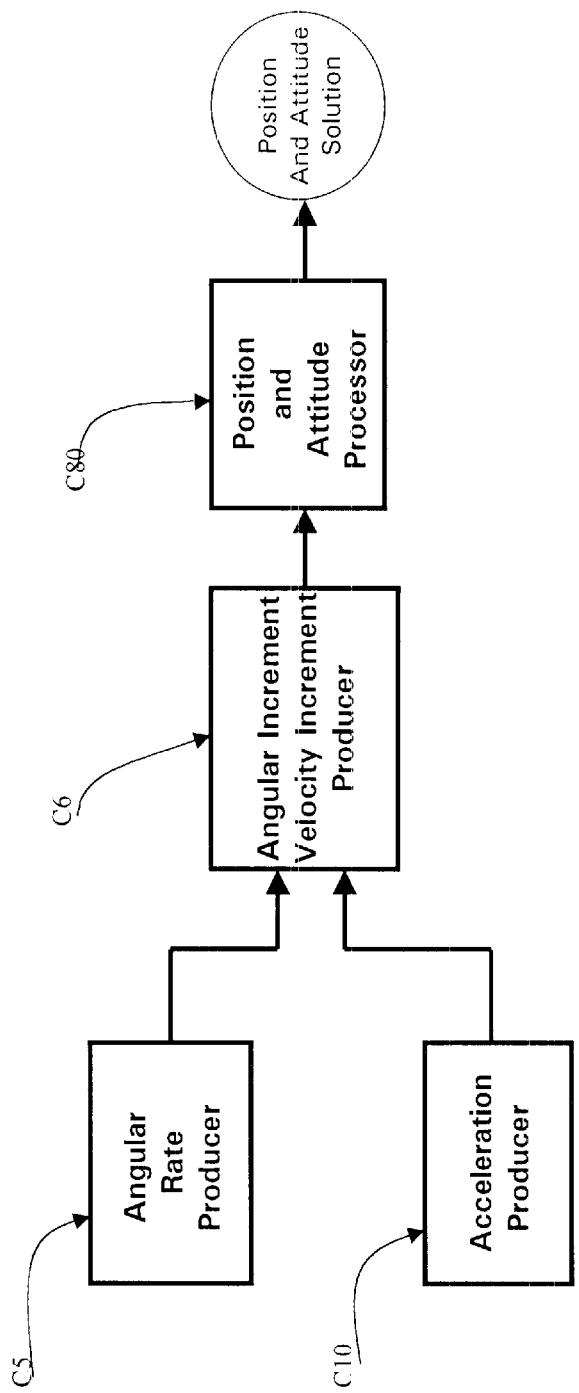
FIG. 4 is a block diagram illustrating the processing module for a micro inertial measurement unit according to a preferred embodiment of the present invention.

Referring to FIG. 4, the micro inertial measurement unit of the present invention comprises an angular rate producer $c5$ for producing three-axis (X axis, Y axis and Z axis) angular rate signals, an acceleration producer $c10$ for producing three-axis (X-axis, Y axis and Z axis) acceleration signals, and an angular increment and velocity increment producer $c6$ for converting the three-axis angular rate signals into digital angular increments and for converting the input three-axis acceleration signals into digital velocity increments.

Moreover, a position and attitude processor c80 is adapted to further connect with the micro IMU of the present invention to compute position, attitude and heading angle measurements using the three-axis digital angular increments and three-axis velocity increments to provide a user with a rich motion measurement to meet diverse needs.

The position, attitude and heading processor c80 further comprises two optional running modules:

(1) Attitude and Heading Module c81, producing attitude and heading angle only; and
(2) Position, Velocity, Attitude, and Heading Module c82, producing position, velocity, and attitude angles.

In general, the angular rate producer c5 and the acceleration producer c10 are very sensitive to a variety of temperature environments. In order to improve measurement accuracy, referring to FIG. 5, the present invention further comprises a thermal controlling means for maintaining a predetermined operating temperature of the angular rate producer c5, the acceleration producer c10 and the angular increment and velocity increment producer c6. It is worth to mention that if the angular rate producer c5, the acceleration producer c10 and the angular increment and velocity increment producer c6 are operated in an environment under prefect and constant thermal control, the thermal controlling means can be omitted.

Figure 5:
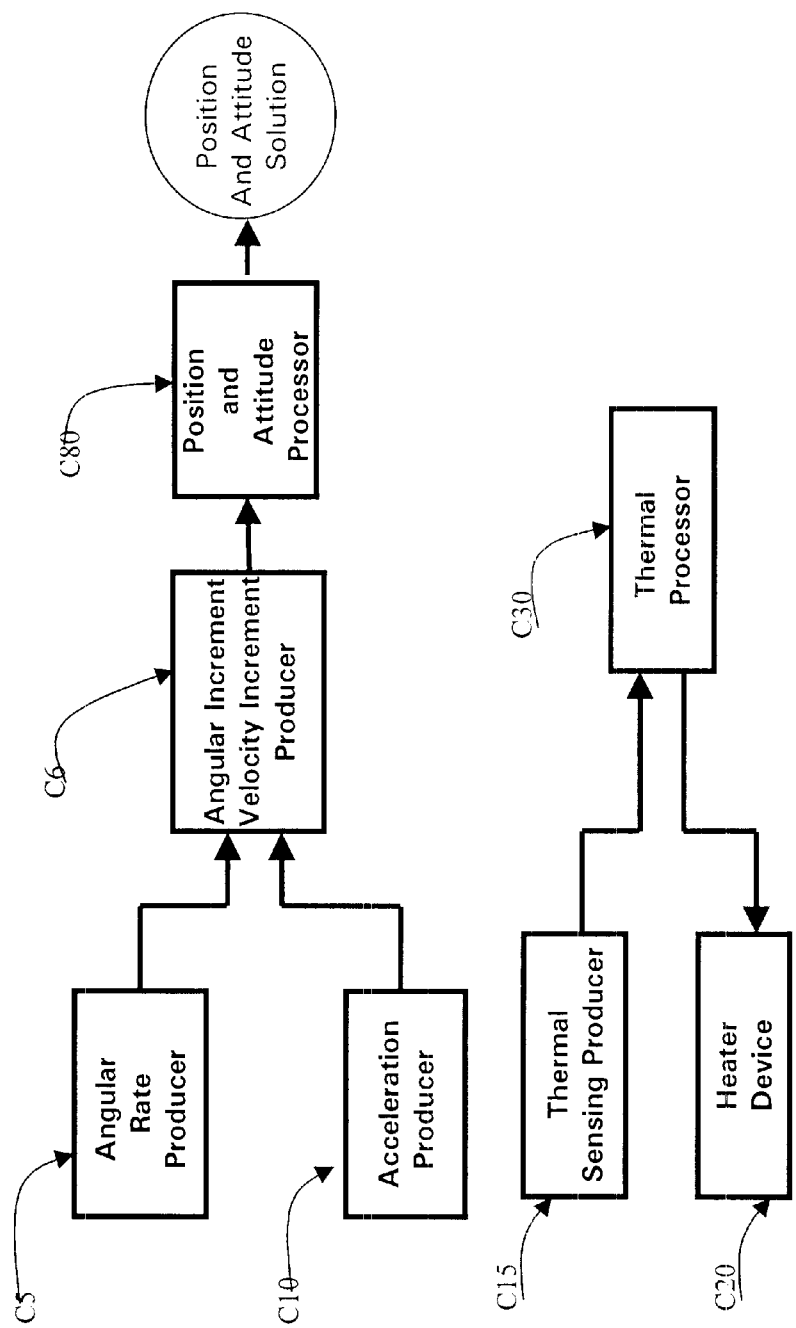
FIG. 5 is a block diagram illustrating the processing modules with thermal control processing for the micro inertial measurement unit according to the above preferred embodiment of the present invention.

According to the preferred embodiment of the present invention, as shown in FIG. 5, the thermal controlling means comprises a thermal sensing producer device c15, a heater device c20 and a thermal processor c30.

The thermal sensing producer device c15, which produces temperature signals, is processed in parallel with the angular rate producer c5 and the acceleration producer c10 for maintaining a predetermined operating temperature of the angular rate producer c5 and the acceleration producer c10 and angular increment and velocity increment producer c6 of the micro IMU, wherein the predetermined operating temperature is a constant designated temperature selected between 150° F. and 185° F., preferable 176° F. (+0.1° F.).

The temperature signals produced from the thermal sensing producer device c15 are input to the thermal processor c30 for computing temperature control commands using the temperature signals, a temperature scale factor, and a predetermined operating temperature of the angular rate producer c5 and the acceleration producer c10, and produce driving signals to the heater device c20 using the temperature control commands for controlling the heater device c20 to provide adequate heat for maintaining the predetermined operating temperature in the micro IMU.

Temperature characteristic parameters of the angular rate producer c5 and the acceleration producer c10 can be determined during a series of the angular rate producer and acceleration producer temperature characteristic calibrations.

Figure 6:
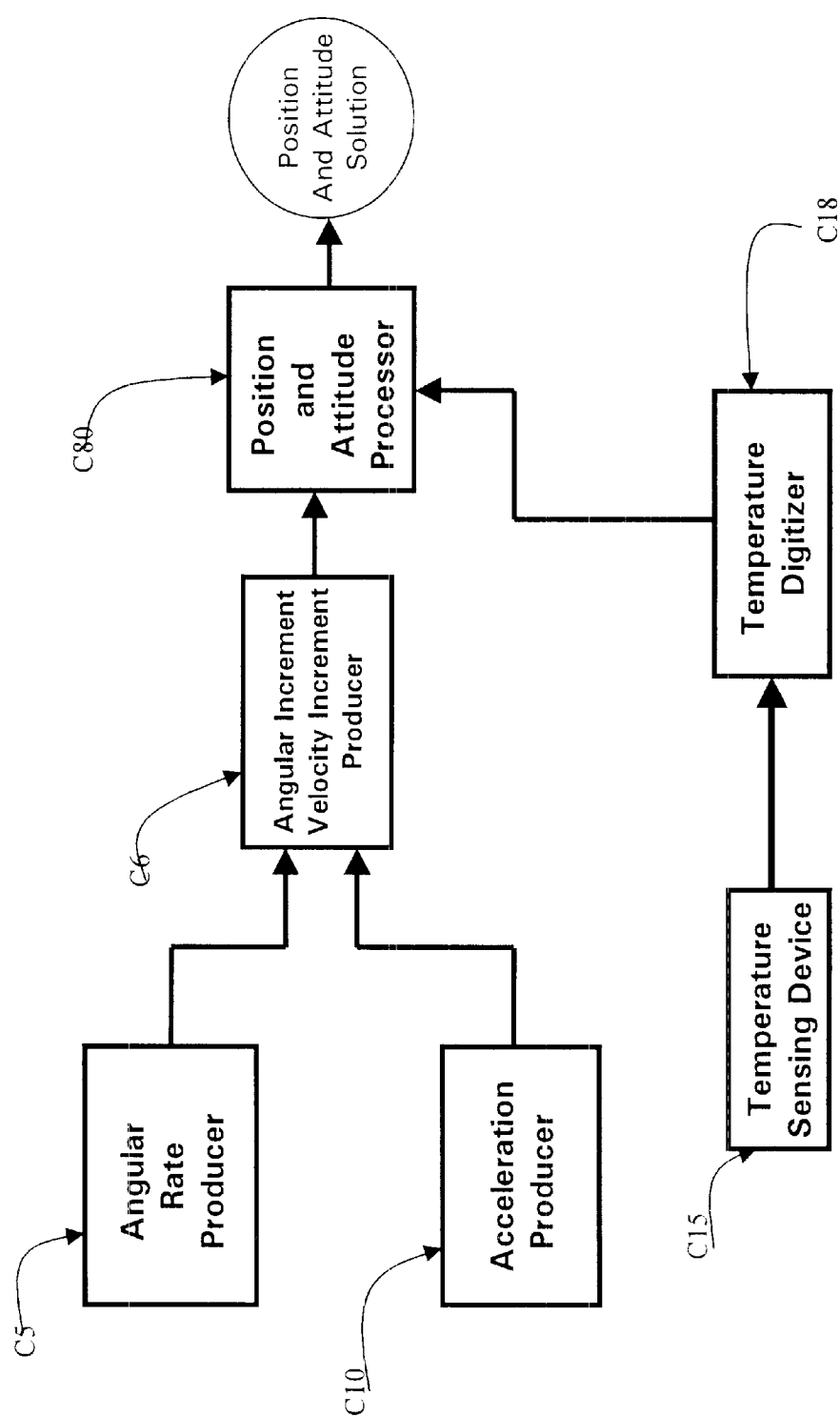
FIG. 6 is a block diagram illustrating the processing modules with thermal compensation processing for the micro inertial measurement unit according to the above preferred embodiment of the present invention.
Figure 15:
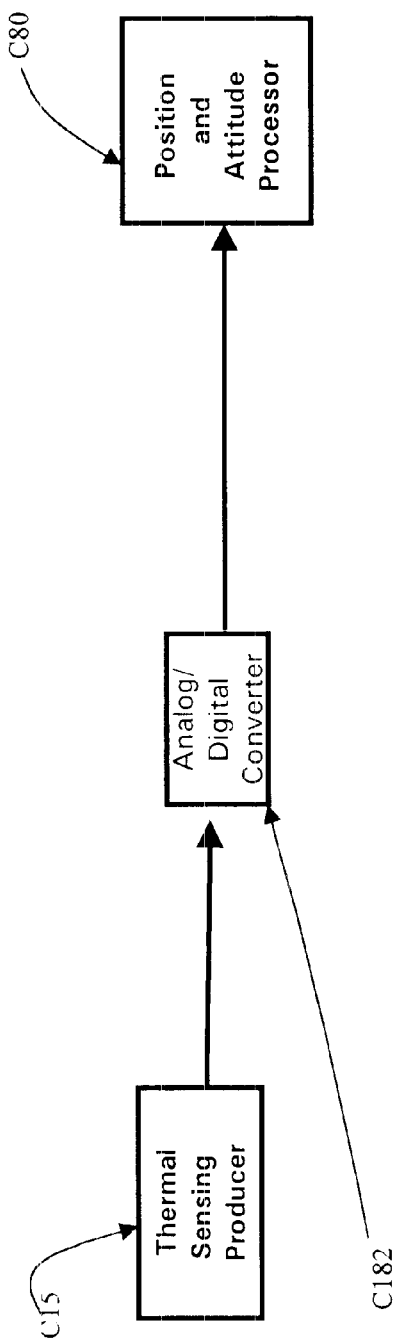
FIG. 15 is a block diagram illustrating a temperature digitizer for outputting analog voltage signals of the thermal sensing producer according to the above preferred embodiment of the present invention.

Referring to FIG. 6, when the above thermal processor c30 and the heater device c20 are not provided, in order to compensate the angular rate producer and acceleration producer measurement errors induced by a variety of temperature environments, the micro IMU of the present invention can alternatively comprise a temperature digitizer c18 for receiving the temperature signals produced from the thermal sensing producer device c15 and outputting a digital temperature value to the position, attitude, and heading processor c80. As shown in FIG. 15, the temperature digitizer c18 can be embodied to comprise an analog/digital converter c182.

Moreover, the position, attitude, and heading processor c80 is adapted for accessing temperature characteristic parameters of the angular rate producer and the acceleration producer using a current temperature of the angular rate producer and the acceleration producer from the temperature digitizer c18, and compensating the errors induced by thermal effects in the input digital angular and velocity increments and computing attitude and heading angle measurements using the three-axis digital angular increments and three-axis velocity increments in the attitude and heading processor c80.

In most applications, the output of the angular rate producer c5 and the acceleration producer c10 are analog voltage signals. The three-axis analog angular rate voltage signals produced from the angular producer c5 are directly proportional to carrier angular rates, and the three-axis analog acceleration voltage signals produced from the acceleration producer c10 are directly proportional to carrier accelerations.

Figure 8:
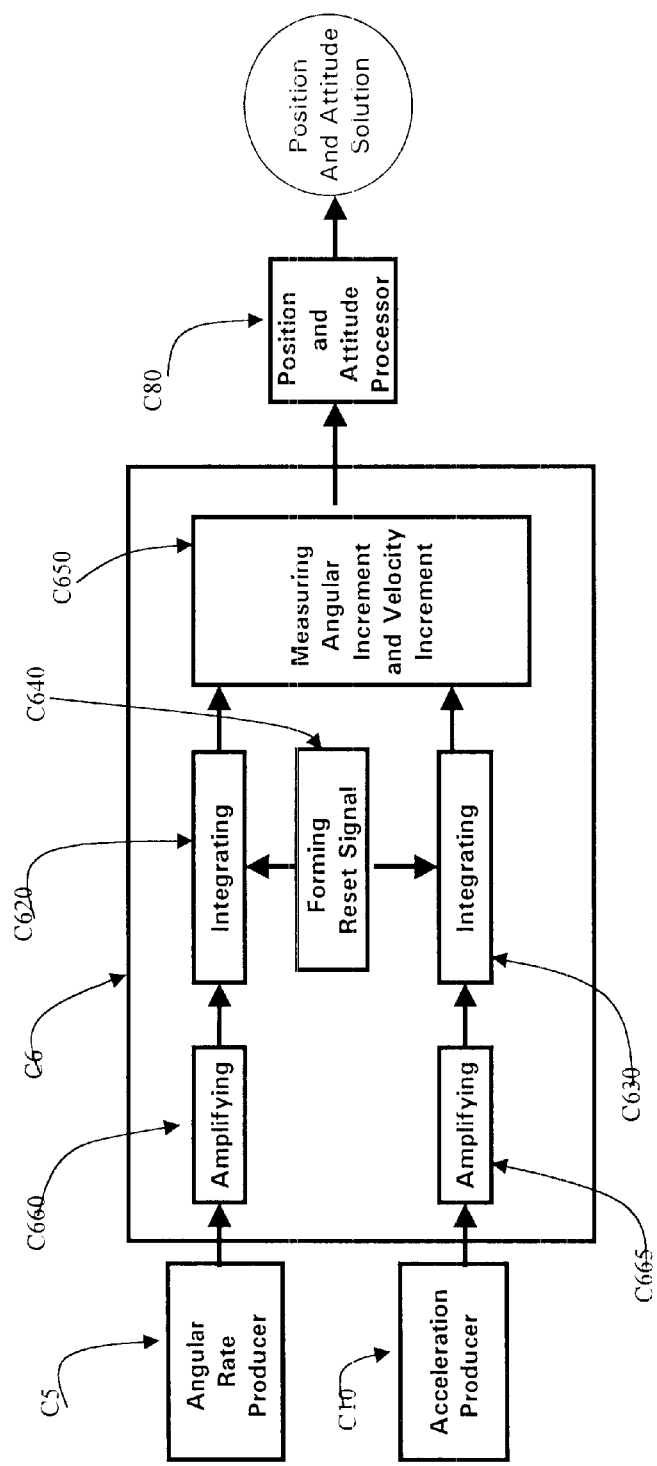
FIG. 8 is a block diagram illustrating another angular increment and velocity increment producer for outputting voltage signals of angular rate producer and acceleration producer for the micro inertial measurement unit according to the above preferred embodiment of the present invention.
Figure 9:
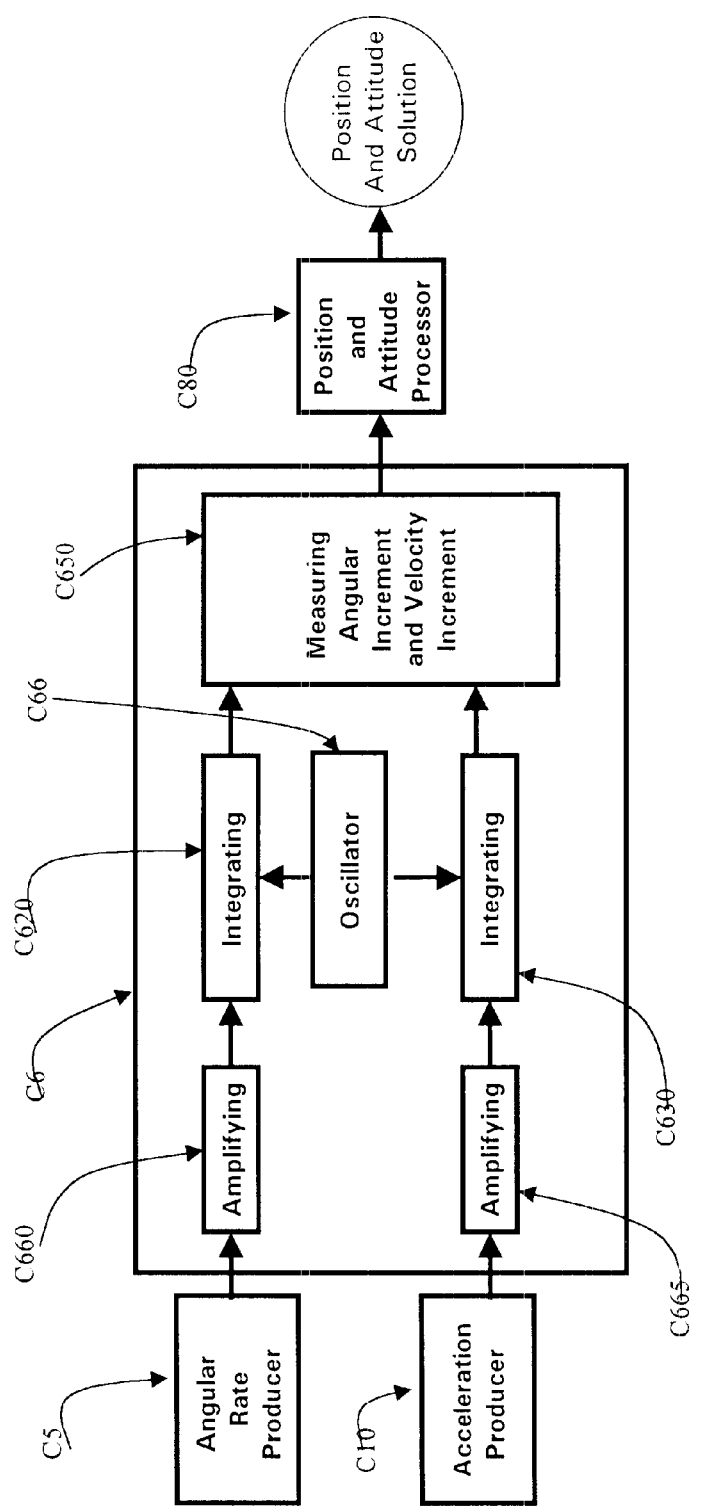
FIG. 9 is a block diagram illustrating another angular increment and velocity increment producer for outputting voltage signals of an angular rate producer and acceleration producer for the micro inertial measurement unit according to the above preferred embodiment of the present invention.

When the outputting analog voltage signals of the angular rate producer c5 and the acceleration producer c10 are too weak for the angular increment and velocity increment producer c6 to read, the angular increment and velocity increment producer c6 may employ amplifying means c660 and c665 for amplifying the analog voltage signals input from the angular rate producer c5 and the acceleration producer c10 and suppress noise signals residing within the analog voltage signals input from the angular rate producer c5 and the acceleration producer c10, as shown in FIGS. 8 and 9.

Figure 7:
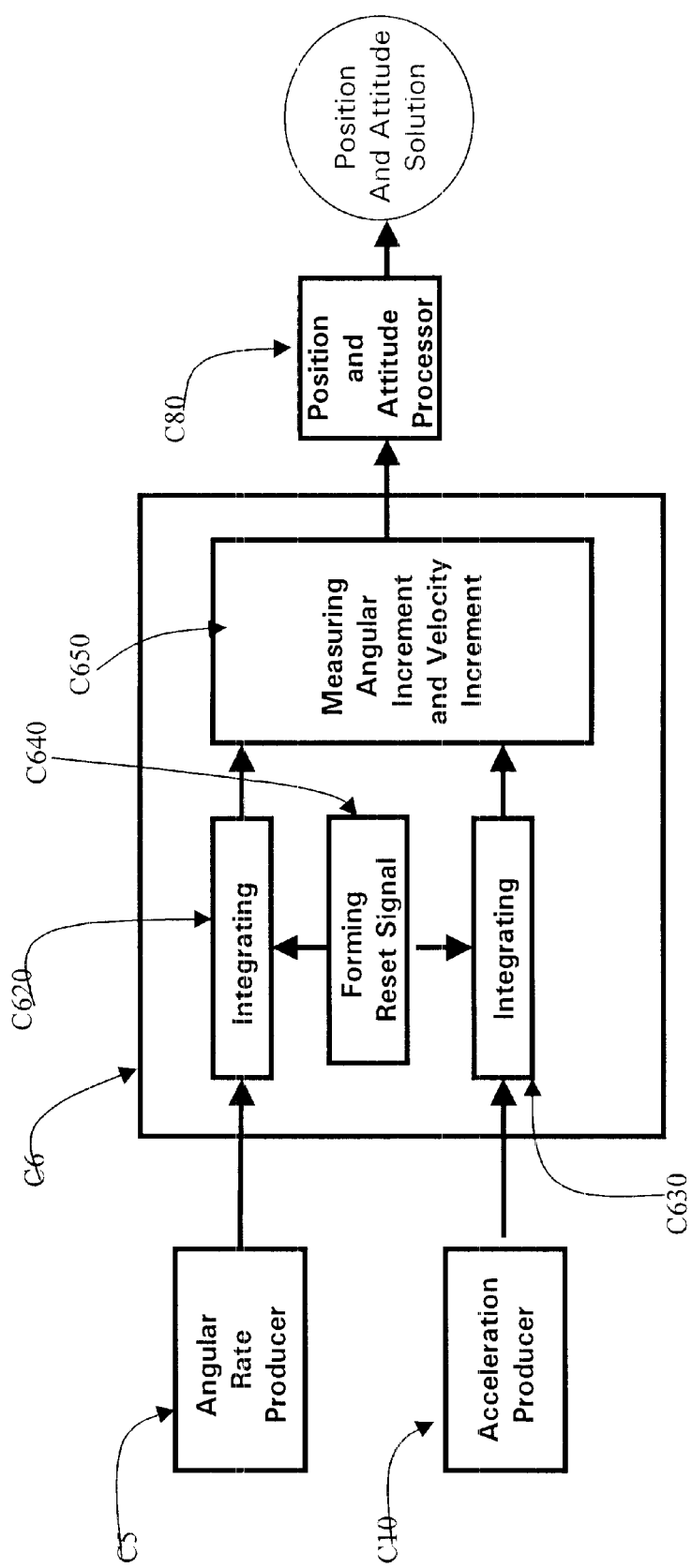
FIG. 7 is a block diagram illustrating an angular increment and velocity increment producer for outputting voltage signals of the angular rate producer and acceleration producer for the micro inertial measurement unit according to the above preferred embodiment of the present invention.

Referring to FIG. 7, the angular increment and velocity increment producer c6 comprises an angular integrating means c620, an acceleration integrating means c630, a resetting means c640, and an angular increment and velocity increment measurement means c650.

The angular integrating means c620 and the acceleration integrating means c630 are adapted for respectively integrating the three-axis analog angular rate voltage signals and the three-axis analog acceleration voltage signals for a predetermined time interval to accumulate the three-axis analog angular rate voltage signals and the three-axis analog acceleration voltage signals as an uncompensated three-axis angular increment and an uncompensated three-axis velocity increment for the predetermined time interval to achieve accumulated angular increments and accumulated velocity increments. The integration is performed to remove noise signals that are non-directly proportional to the carrier angular rate and acceleration within the three-axis analog angular rate voltage signals and the three-axis analog acceleration voltage signals, to improve the signal-to-noise ratio, and to remove the high frequency signals in the three-axis analog angular rate voltage signals and the three-axis analog acceleration voltage signals. The signals are directly proportional to the carrier angular rate and acceleration within the three-axis analog angular rate voltage signals and the three-axis analog acceleration voltage signals.

The resetting means forms an angular reset voltage pulse and a velocity reset voltage pulse as an angular scale and a velocity scale which are input into the angular integrating means c620 and the acceleration integrating means c630 respectively.

The angular increment and velocity increment measurement means c650 is adapted for measuring the voltage values of the three-axis accumulated angular increments and the three-axis accumulated velocity increments with the angular reset voltage pulse and the velocity reset voltage pulse respectively to acquire angular increment counts and velocity increment counts as a digital form of the angular increment and velocity increment measurements respectively.

In order to output real three-angular increment and velocity increment values as an optional output format to substitute the voltage values of the three-axis accumulated angular increments and velocity increments, the angular increment and velocity increment measurement means c650 also scales the voltage values of the three-axis accumulated angular and velocity increments into real three-axis angular and velocity increment voltage values.

In the angular integrating means c620 and the acceleration integrating means c630, the three-axis analog angular voltage signals and the three-axis analog acceleration voltage signals are each reset to accumulate from a zero value at an initial point of every predetermined time interval.

As shown in FIG. 9, in general, the resetting means c640 can be an oscillator c66, so that the angular reset voltage pulse and the velocity reset voltage pulse are implemented by producing a timing pulse by the oscillator c66. In applications, the oscillator c66 can be built with circuits, such as Application Specific Integrated Circuits (ASIC) chip and a printed circuit board.

Figure 10:
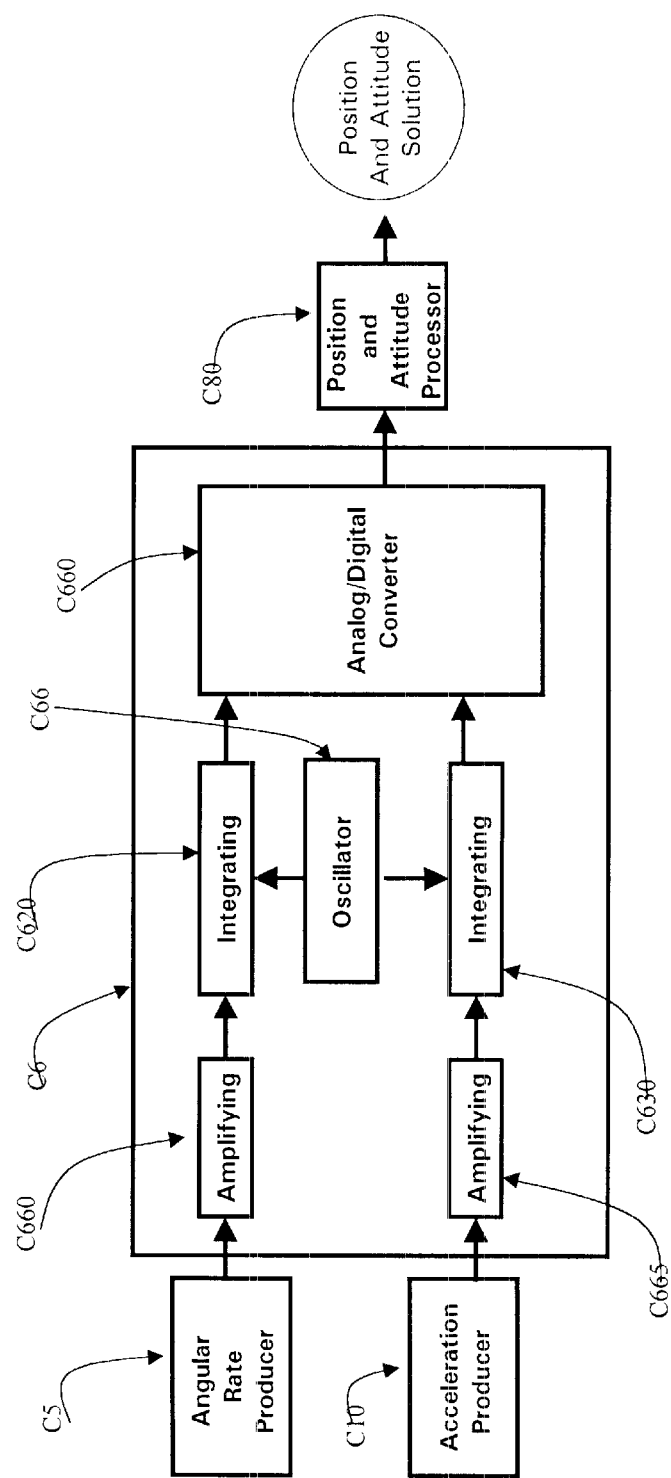
FIG. 10 is a block diagram illustrating another angular increment and velocity increment producer for outputting voltage signals of an angular rate producer and acceleration producer for the micro inertial measurement unit according to the above preferred embodiment of the present invention.

As shown in FIG. 10, the angular increment and velocity increment measurement means c650, which is adapted for measuring the voltage values of the three-axis accumulated angular and velocity increments, is embodied as an analog/digital converter c650. In other words, the analog/digital converter c650 substantially digitizes the raw three-axis angular increment and velocity increment voltage values into digital three-axis angular increment and velocity increments.

Figure 14:
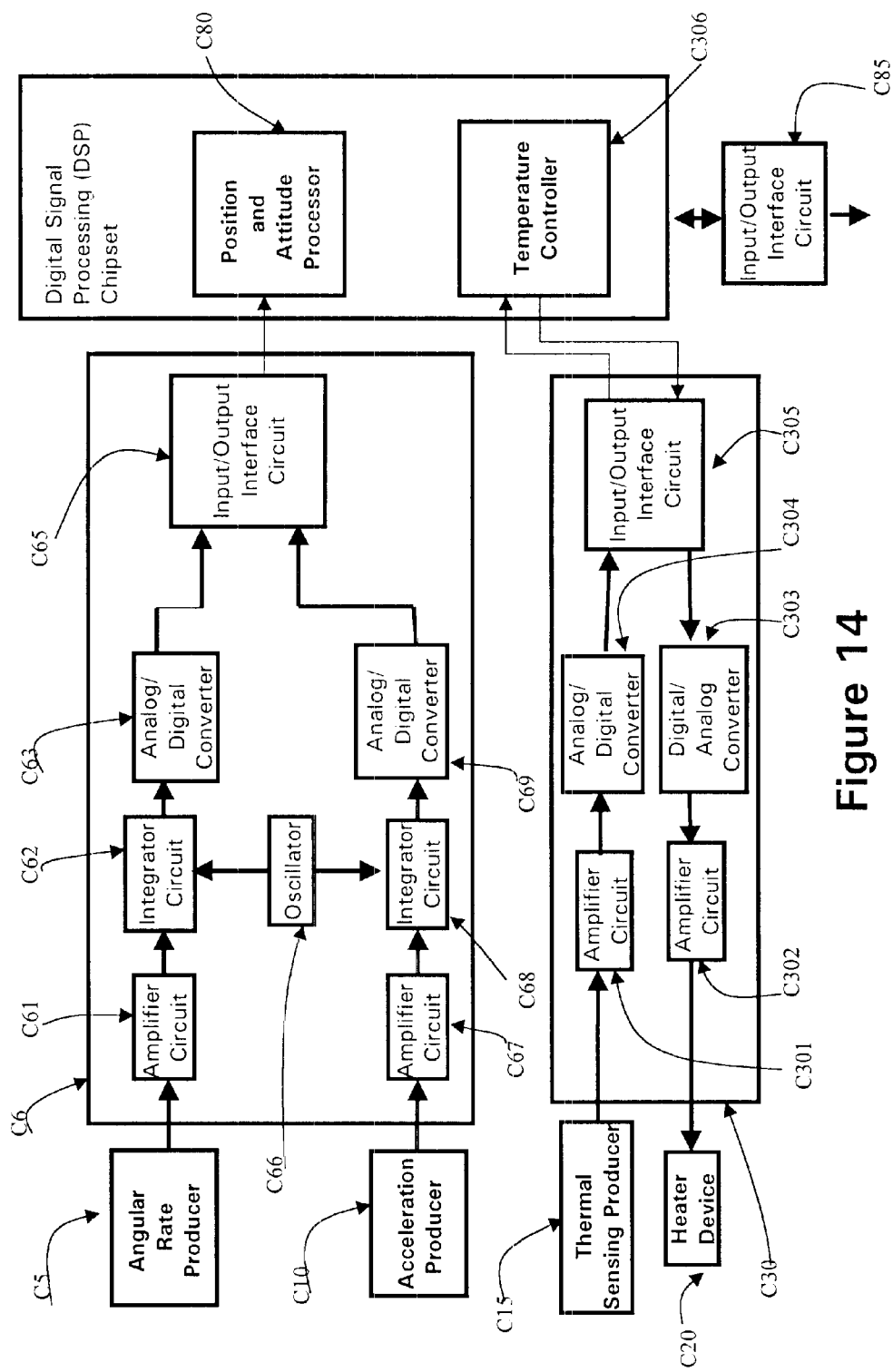
FIG. 14 is a block diagram illustrating a processing module for the micro inertial measurement unit according to the above preferred embodiment of the present invention.
Figure 17:
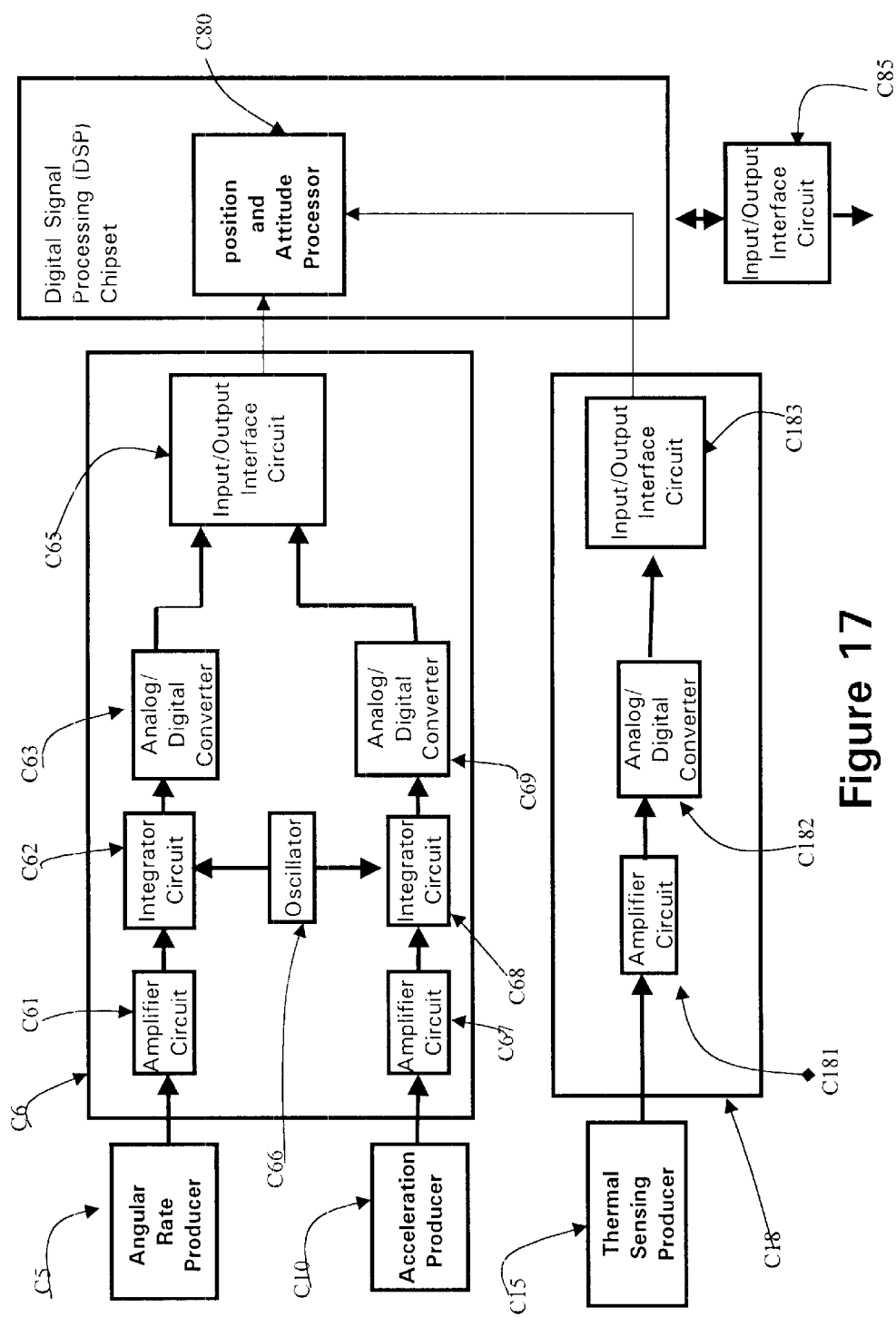
FIG. 17 is a block diagram illustrating a processing module with thermal compensation processing for the micro inertial measurement unit according to the above preferred embodiment of the present invention.

Referring to FIGS. 14 and 17, the amplifying means c660 and c665 of the angular increment and velocity increment producer c6 are embodied by an angular amplifier circuit c61 and an acceleration amplifier circuit c67 respectively to amplify the three-axis analog angular rate voltage signals and the three-axis analog acceleration voltage signals to form amplified three-axis analog angular rate signals and amplified three-axis analog acceleration signals respectively.

The angular integrating means c620 and the acceleration integrating means c630 of the angular increment and velocity increment producer c6 are respectively embodied as an angular integrator circuit c62 and an acceleration integrator circuit c68 for receiving the amplified three-axis analog angular rate signals and the amplified three-axis analog acceleration signals from the angular and acceleration amplifier circuits c61, c67 which are integrated to form the accumulated angular increments and the accumulated velocity increments respectively.

The analog/digital converter c650 of the angular increment and velocity increment producer c6 further includes an angular analog/digital converter c63, a velocity analog/digital converter c69 and an input/output interface circuit c65.

The accumulated angular increments output from the angular integrator circuit c62 and the accumulated velocity increments output from the acceleration integrator circuit are input into the angular analog/digital converter c63 and the velocity analog/digital converter c69 respectively.

The accumulated angular increments are digitized by the angular analog/digital converter c63 by measuring the accumulated angular increments with the angular reset voltage pulse to form digital angular measurements of voltage in terms of the angular increment counts which are output to the input/output interface circuit c65 to generate digital three-axis angular increment voltage values.

The accumulated velocity increments are digitized by the velocity analog/digital converter c69 by measuring the accumulated velocity increments with the velocity reset voltage pulse to form digital velocity measurements of voltage in terms of the velocity increment counts which are output to the input/output interface circuit c65 to generate digital three-axis velocity increment voltage values.

Figure 11:
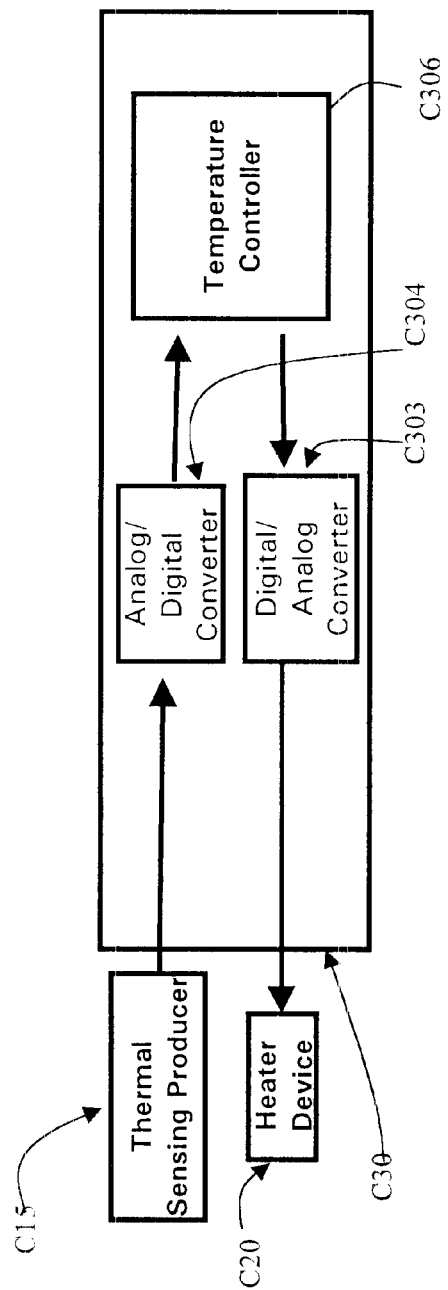
FIG. 11 is a block diagram illustrating a thermal processor for outputting analog voltage signals of the thermal sensing producer according to the above preferred embodiment of the present invention.

Referring to FIGS. 4 and 11, in order to achieve flexible adjustment of the thermal processor c30 for the thermal sensing producer device c15 with analog voltage output and the heater device c20 with analog input, the thermal processor c30 can be implemented in a digital feedback controlling loop as shown in FIG. 11.

The thermal processor c30, as shown in FIG. 11, comprises an analog/digital converter c304 connected to the thermal sensing producer device c15, a digital/analog converter c303 connected to the heater device c20, and a temperature controller c306 connected with both the analog/digital converter c304 and the digital/analog converter c303. The analog/digital converter c304 inputs the temperature voltage signals produced by the thermal sensing producer device c15, wherein the temperature voltage signals are sampled in the analog/digital converter c304 to sampled temperature voltage signals which are further digitized to digital signals and output to the temperature controller c306.

The temperature controller c306 computes digital temperature commands using the input digital signals from the analog/digital converter c304, a temperature sensor scale factor, and a pre-determined operating temperature of the angular rate producer and acceleration producer, wherein the digital temperature commands are fed back to the digital/analog converter c303.

The digital/analog converter c303 converts the digital temperature commands input from the temperature controller c306 into analog signals which are output to the heater device c20 to provide adequate heat for maintaining the predetermined operating temperature of the micro IMU of the present invention.

Figure 12:
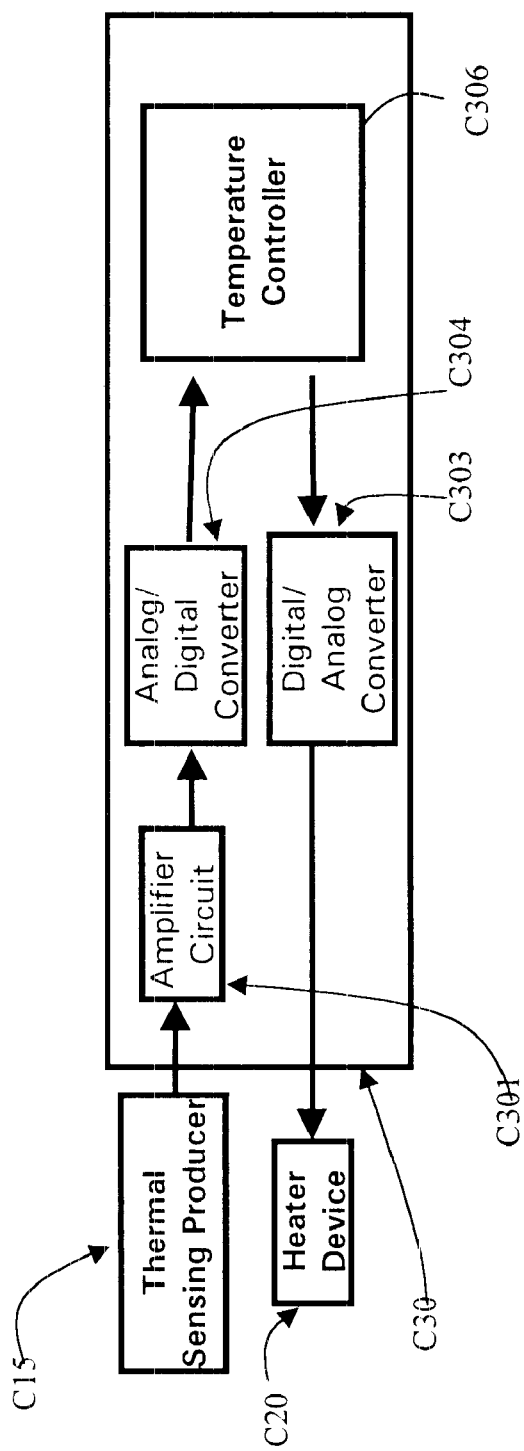
FIG. 12 is a block diagram illustrating another thermal processor for outputting analog voltage signals of the thermal sensing producer according to the above preferred embodiment of the present invention.

Moreover, as shown in FIG. 12, if the voltage signals produced by the thermal sensing producer device c15 are too weak for the analog/digital converter c304 to read, the thermal processor c30 further comprises a first amplifier circuit c301 between the thermal sensing producer device c15 and the digital/analog converter c303, wherein the voltage signals from the thermal sensing producer device c15 is first input into the first amplifier circuit c301 for amplifying the signals and suppressing the noise residing in the voltage signals and improving the signal-to-noise ratio, wherein the amplified voltage signals are then output to the analog/digital converter c304.

The heater device c20 requires a specific driving current signal. In this case, referring to FIG. 13, the thermal processor c30 can further comprise a second amplifier circuit 302 between the digital/analog converter c303 and heater device c20 for amplifying the input analog signals from the digital/analog converter c303 for driving the heater device c20.

In other words, the digital temperature commands input from the temperature controller c306 are converted in the digital/analog converter c303 into analog signals which are then output to the amplifier circuit c302.

Referring to FIG. 14, an input/output interface circuit c305 is required to connect the analog/digital converter c304 and digital/analog converter c303 with the temperature controller c306. In this case, as shown in FIG. 14, the voltage signals are sampled in the analog/digital converter c304 to form sampled voltage signals that are digitized into digital signals. The digital signals are output to the input/output interface circuit c305.

As mentioned above, the temperature controller c306 is adapted to compute the digital temperature commands using the input digital temperature voltage signals from the input/output interface circuit c305, the temperature sensor scale factor, and the pre-determined operating temperature of the angular rate producer and acceleration producer, wherein the digital temperature commands are fed back to the input/output interface circuit c305. Moreover, the digital/analog converter c303 further converts the digital temperature commands input from the input/output interface circuit c305 into analog signals which are output to the heater device c20 to provide adequate heat for maintaining the predetermined operating temperature of the micro IMU.

Referring to FIG. 15, as mentioned above, the thermal processor c30 and the heater device c20 as disclosed in FIGS. 5, 11, 12, 13, and 14 can alternatively be replaced by the analog/digital converter c182 connected to the thermal sensing producer device c15 to receive the analog voltage output from the thermal sensing producer device c15. If the voltage signals produced by the thermal sensing producer device c15 are too weak for the analog/digital converter c182 to read, referring to FIG. 16, an additional amplifier circuit c181 can be connected between the thermal sensing producer device c15 and the digital/analog converter c182 for amplifying the analog voltage signals and suppressing the noise residing in the voltage signals and improving the voltage signal-to-noise ratio, wherein the amplified voltage signals are output to the analog/digital converter c182 and sampled to form sampled voltage signals that are further digitized in the analog/digital converters c182 to form digital signals connected to the attitude and heading processor c80.

Alternatively, an input/output interface circuit c183 can be connected between the analog/digital converter c182 and the attitude and heading processor c80. In this case, referring to FIG. 17, the input amplified voltage signals are sampled to form sampled voltage signals that are further digitized in the analog/digital converters to form digital signals connected to the input/output interface circuit c183 before inputting into the attitude and heading processor c80.

Referring to FIG. 4, the digital three-axis angular increment voltage values or real values and three-axis digital velocity increment voltage values or real values are produced and outputted from the angular increment and velocity increment producer c6.

Figure 18:
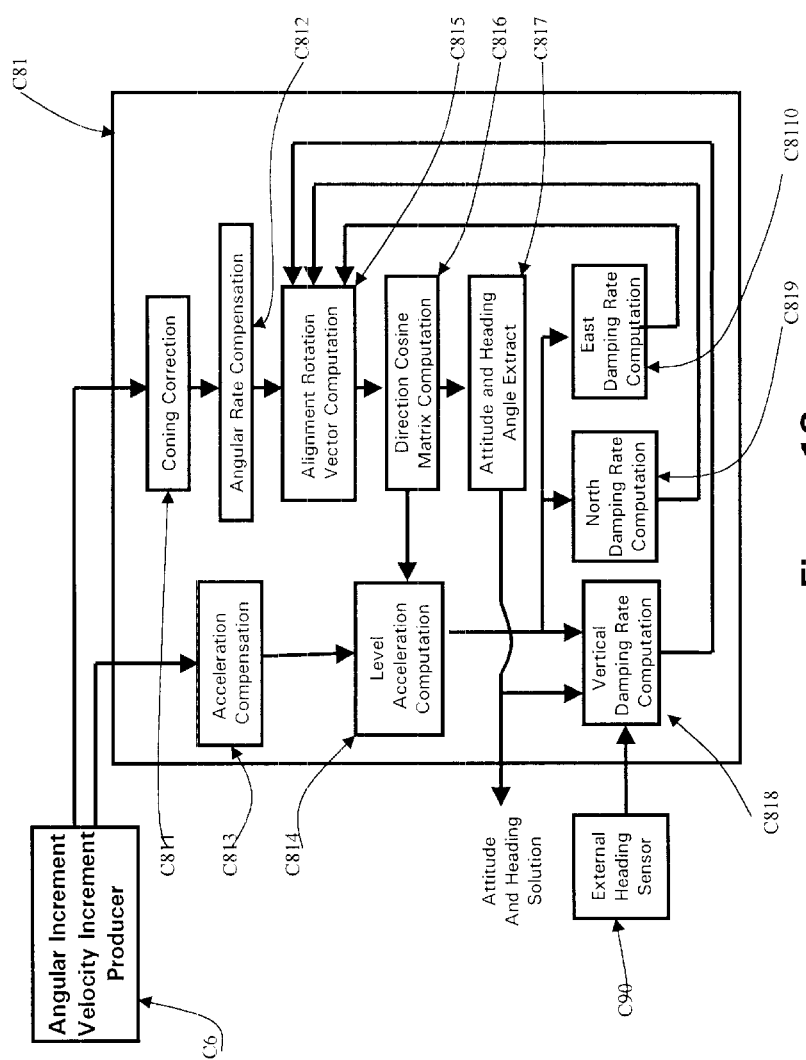
FIG. 18 is a block diagram illustrating the attitude and heading processing module according to the above preferred embodiment of the present invention.

In order to adapt to digital three-axis angular increment voltage values and three-axis digital velocity increment voltage values from the angular increment and velocity increment producer c6, the attitude and heading module c81, as shown in FIG. 18, comprises a coning correction module c811, wherein digital three-axis angular increment voltage values from the input/output interface circuit c65 of the angular increment and velocity increment producer c6 and coarse angular rate bias obtained from an angular rate producer and acceleration producer calibration constants table at a high data rate (short interval) are input into the coning correction module c811, which computes coning effect errors by using the input digital three-axis angular increment voltage values and coarse angular rate bias, and outputs three-axis coning effect terms and three-axis angular increment voltage values at a reduced data rate (long interval), which are called three-axis long-interval angular increment voltage values.

The attitude and heading module c81 further comprises an angular rate compensation module c812 and an alignment rotation vector computation module c815. In the angular rate compensation module c812, the coning effect errors and three-axis long-interval angular increment voltage values from the coning correction module c811 and angular rate device misalignment parameters, fine angular rate bias, angular rate device scale factor, and coning correction scale factor from the angular rate producer and acceleration producer calibration constants table are connected to the angular rate compensation module c812 for compensating definite errors in the three-axis long-interval angular increment voltage values using the coning effect errors, angular rate device misalignment parameters, fine angular rate bias, and coning correction scale factor, and transforming the compensated three-axis long-interval angular increment voltage values to real three-axis long-interval angular increments using the angular rate device scale factor. Moreover, the real three-axis angular increments are output to the alignment rotation vector computation module c815.

The attitude and heading module c81 further comprises an accelerometer compensation module c813 and a level acceleration computation module c814, wherein the three-axis velocity increment voltage values from the angular increment and velocity increment producer c6 and acceleration device misalignment, acceleration device bias, and acceleration device scale factor from the angular rate producer and acceleration producer calibration constants table are connected to the accelerometer compensation module c813 for transforming the three-axis velocity increment voltage values into real three-axis velocity increments using the acceleration device scale factor, and compensating the definite errors in three-axis velocity increments using the acceleration device misalignment, accelerometer bias, wherein the compensated three-axis velocity increments are connected to the level acceleration computation module c814.

By using the compensated three-axis angular increments from the angular rate compensation module c812, an east damping rate increment from an east damping rate computation module c8110, a north damping rate increment from a north damping rate computation module c819, and vertical damping rate increment from a vertical damping rate computation module c818, a quaternion, which is a vector representing rotation angle of the carrier, is updated, and the updated quaternion is connected to a direction cosine matrix computation module c816 for computing the direction cosine matrix, by using the updated quaternion.

The computed direction cosine matrix is connected to the level acceleration computation module c814 and an attitude and heading angle extract module c817 for extracting attitude and heading angle using the direction cosine matrix from the direction cosine matrix computation module c816.

The compensated three-axis velocity increments are connected to the level acceleration computation module c814 for computing level velocity increments using the compensated three-axis velocity increments from the acceleration compensation module c814 and the direction cosine matrix from the direction cosine matrix computation module c816.

The level velocity increments are connected to the east damping rate computation module c8110 for computing east damping rate increments using the north velocity increment of the input level velocity increments from the level acceleration computation module c814.

The level velocity increments are connected to the north damping rate computation module c819 for computing north damping rate increments using the east velocity increment of the level velocity increments from the level acceleration computation module c814.

The heading angle from the attitude and heading angle extract module c817 and a measured heading angle from the external heading sensor c90 are connected to the vertical damping rate computation module c818 for computing vertical damping rate increments.

The east damping rate increments, north damping rate increments, and vertical damping rate are fed back to the alignment rotation vector computation module c815 to damp the drift of errors of the attitude and heading angles.

Alternatively, in order to adapt real digital three-axis angular increment values and real three-axis digital velocity increment values from the angular increment and velocity increment producer c6, referring to FIG. 18, the real digital three-axis angular increment values from the angular increment and velocity increment producer c6 and coarse angular rate bias obtained from an angular rate producer and acceleration producer calibration constants table at a high data rate (short interval) are connected to the coning correction module c811 for computing coning effect errors in the coning correction module c811 using the digital three-axis angular increment values and coarse angular rate bias and outputting three-axis coning effect terms and three-axis angular increment values at reduced data rate (long interval), which are called three-axis long-interval angular increment values, into the angular rate compensation module-c812.

The coning effect errors and three-axis long-interval angular increment values from the coning correction module c811 and angular rate device misalignment parameters and fine angular rate bias from the angular rate producer and acceleration producer calibration constants table are connected to the angular rate compensation module c812 for compensating definite errors in the three-axis long-interval angular increment values using the coning effect errors, angular rate device misalignment parameters, fine angular rate bias, and coning correction scale factor, and outputting the real three-axis angular increments to the alignment rotation vector computation module c815.

The three-axis velocity increment values from the angular increment and velocity increment producer c6 and acceleration device misalignment, and acceleration device bias from the angular rate producer and acceleration producer calibration are connected into the accelerometer compensation module c813 for compensating the definite errors in three-axis velocity increments using the acceleration device misalignment, and accelerometer bias; outputting the compensated three-axis velocity increments to the level acceleration computation module c814.

It is identical to the above mentioned processing that the following modules use the compensated three-axis angular increments from the angular rate compensation module c812 and compensated three-axis velocity increments from the acceleration compensation module c813 to produce attitude and heading angle.

Referring to FIGS. 6, 17 and 18, it uses the temperature compensation method by means of the temperature digitizer c18, in order to adapt to digital three-axis angular increment voltage value and three-axis digital velocity increment voltage values from the angular increment and velocity increment producer c6, the digital three-axis angular increment voltage values from the angular increment and velocity increment producer c6 and coarse angular rate bias obtained from an angular rate producer and acceleration producer calibration constants table at a high data rate (short interval) are connected to the coning correction module c811 for computing coning effect errors in the coning correction module c811 using the digital three-axis angular increment voltage values and coarse angular rate bias, and outputting three-axis coning effect terms and three-axis angular increment voltage values at a reduced data rate (long interval), which are called three-axis long-interval angular increment voltage values, into the angular rate compensation module c812.

The coning effect errors and three-axis long-interval angular increment voltage values from the coning correction module c811 and angular rate device misalignment parameters, fine angular rate bias, angular rate device scale factor, coning correction scale factor from the angular rate producer and acceleration producer calibration constants table, the digital temperature signals from input/output interface circuit c183, and temperature sensor scale factor are connected to the angular rate compensation module c812 for computing current temperature of the angular rate producer, accessing angular rate producer temperature characteristic parameters using the current temperature of the angular rate producer, compensating definite errors in the three-axis long-interval angular increment voltage values using the coning effect errors, angular rate device misalignment parameters, fine angular rate bias, and coning correction scale factor, transforming the compensated three-axis long-interval angular increment voltage values to real three-axis long-interval angular increments, compensating temperature-induced errors in the real three-axis long-interval, angular increments using the angular rate producer temperature characteristic parameters, and outputting the real three-axis angular increments to the alignment rotation vector computation module c815.

The three-axis velocity increment voltage values from the angular increment and velocity increment producer c6 and acceleration device misalignment, acceleration bias, acceleration device scale factor from the angular rate producer and acceleration producer calibration constants table, the digital temperature signals from the input/output interface circuit c183 of the temperature digitizer c18, and temperature sensor scale factor are connected to the acceleration compensation module c813 for computing current temperature of the acceleration producer, accessing acceleration producer temperature characteristic parameters using the current temperature of the acceleration producer, transforming the three-axis velocity increment voltage values into real three-axis velocity increments using the acceleration device scale factor, compensating the definite errors in the three-axis velocity increments using the acceleration device misalignment and acceleration bias, compensating temperature-induced errors in the real three-axis velocity increments using the acceleration producer temperature characteristic parameters, and outputting the compensated three-axis velocity increments to the level acceleration computation module c814.

It is identical to the above mentioned processing that the following modules use the compensated three-axis angular increments from the angular rate compensation module c812 and compensated three-axis velocity increments from the acceleration compensation module c813 to produce the attitude and heading angles.

Alternatively, referring to FIGS. 6, 17, and 18, which use the temperature compensation method, in order to adapt real digital three-axis angular increment values and real three-axis digital velocity increment values from the angular increment and velocity increment producer c6, the attitude and heading module c81 can be further modified to accept the digital three-axis angular increment values from the angular increment and velocity increment producer c6 and coarse angular rate bias obtained from an angular rate producer and acceleration producer calibration constants table at a high data rate (short interval) into the coning correction module c811 for computing coning effect errors in the coning correction module c811 using the input digital three-axis angular increment values and coarse angular rate bias, and outputting three-axis coning effect data and three-axis angular increment data at a reduced data rate (long interval), which are called three-axis long-interval angular increment values, into the angular rate compensation module c812.

The coning effect errors and three-axis long-interval angular increment values from the coning correction module c811 and angular rate device misalignment parameters and fine angular rate bias from the angular rate producer and acceleration producer calibration constants table, the digital temperature signals from the input/output interface circuit c183 and temperature sensor scale factor are connected to the angular rate compensation module c812 for computing current temperature of the angular rate producer, accessing angular rate producer temperature characteristic parameters using the current temperature of the angular rate producer, compensating definite errors in the three-axis long-interval angular increment values using the coning effect errors, angular rate device misalignment parameters, fine angular rate bias, and coning correction scale factor, compensating temperature-induced errors in the real three-axis long-interval angular increments using the angular rate producer temperature characteristic parameters, and outputting the real three-axis angular increments to an alignment rotation vector computation module c815.

The three-axis velocity increment values from the input/output interface circuit c65 and acceleration device misalignment and acceleration bias from the angular rate producer and acceleration producer calibration constants table, the digital temperature signals from the input/output interface circuit c183 and temperature sensor scale factor are input into the acceleration compensation module c813 for computing current temperature of the acceleration producer, accessing the acceleration producer temperature characteristic parameters using the current temperature of the acceleration producer, compensating the definite errors in the three-axis velocity increments using the input acceleration device misalignment, acceleration bias, compensating temperature-induced errors in the real three-axis velocity increments using the acceleration producer temperature characteristic parameters, and outputting the compensated three-axis velocity increments to the level acceleration computation module c814.

It is identical to the above mentioned processing that the following modules use the compensated three-axis angular increments from the angular rate compensation module c812 and compensated three-axis velocity increments from the acceleration compensation module c813 to produce the attitude and heading angles.

Figure 19:
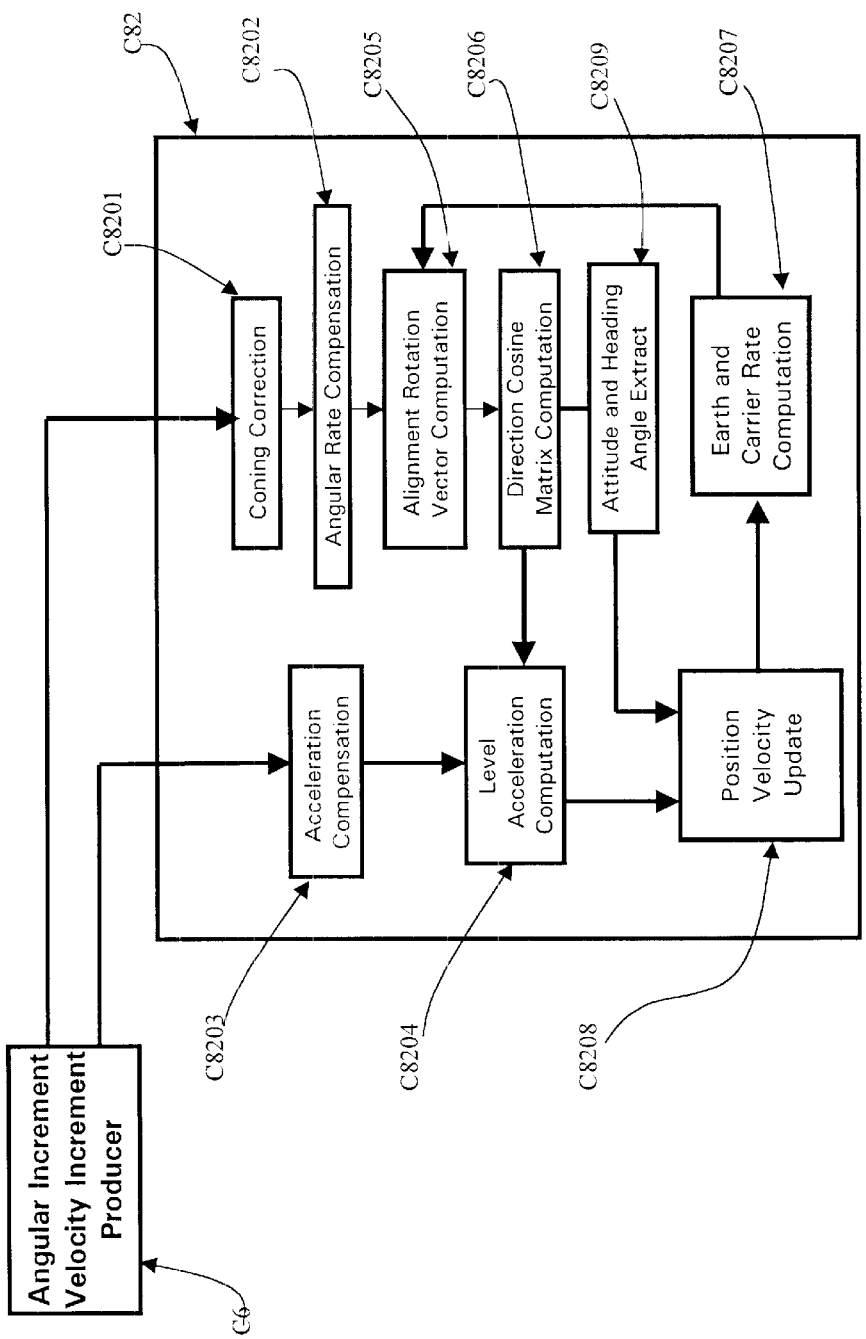
FIG. 19 is a functional block diagram illustrating the position velocity attitude and heading module according to the above preferred embodiment of the present invention.

Referring to FIG. 19, the position, velocity, and attitude module c82 comprises:

a coning correction module c8201, which is same as the coning correction module c811 of the attitude and heading module c81;

an angular rate compensation module c8202, which is same as the angular rate compensation module c812 of the attitude and heading module c81;

an alignment rotation vector computation module c8205, which is same as the alignment rotation vector computation module c815 of the attitude and heading module c81;

a direction cosine matrix computation module c8206, which is same as the Direction cosine matrix computation module c816 of the attitude and heading module c81;

an acceleration compensation module c8203, which is same as the acceleration compensation module c813 of the attitude and heading module c81;

a level acceleration computation module c8204, which is same as the acceleration compensation module c814 of the attitude and heading module c81; and an attitude and heading angle extract module c8209, which is same as the attitude and heading angle extract module c817 of the attitude and heading module c81.

A position and velocity update module c8208 accepts the level velocity increments from the level acceleration computation module c8204 and computes position and velocity solution.

An earth and carrier rate computation module c8207 accepts the position and velocity solution from the position and velocity update module c8208 and computes the rotation rate vector of the local navigation frame (n frame) of the carrier relative to the inertial frame (i frame), which is connected to the alignment rotation vector computation module c8205.

In order to meet the diverse requirements of application systems, referring to FIGS. 14 and 17, the digital three-axis angular increment voltage values, the digital three-axis velocity increment, and digital temperature signals in the input/output interface circuit c65 and the input/output interface circuit c305 can be ordered with a specific format required by an external user system, such as RS-232 serial communication standard, RS-422 serial communication standard, the popular PCI/ISA bus standard, and 1553 bus standard, etc.

In order to meet diverse requirements of application systems, referring to FIGS. 14 and 17, the digital three-axis angular increment values, the digital three-axis velocity increment, and attitude and heading data in the input/output interface circuit c85 are ordered with a specific format required by an external user system, such as RS-232 serial communication standard, RS-422 serial communication standard, PCI/ISA bus standard, and 1553 bus standard, etc.

As mentioned above, one of the key technologies of the present invention to achieve the micro IMU with a high degree of performance is to utilize a micro size angular rate producer, wherein the micro-size angular rate producer with MEMS technologies and associated mechanical supporting structure and circuitry board deployment of the micro IMU of the present invention are disclosed in the following description.

Another of the key technologies of the present invention to achieve the micro IMU with low power consumption is to design a micro size circuitry with small power consumption, wherein the conventional AISC (Application Specific Integrated Circuit) technologies can be utilized to shrink a complex circuitry into a silicon chip.

Existing MEMS technologies, which are employed into the micro size angular rate producer, use vibrating inertial elements (a micromachine) to sense vehicle angular rate via the Coriolis Effect. The angular rate sensing principle of Coriolis Effect is the inspiration behind the practical vibrating angular rate sensors.

The Coriolis Effect can be explained by-saying that when an angular rate is applied to a translating or vibrating inertial element, a Coriolis force is generated. When this angular rate is applied to the axis of an oscillating inertial element, its tines receive a Coriolis force, which then produces torsional forces about the sensor axis. These forces are proportional to the applied angular rate, which then can be measured.

The force (or acceleration), Coriolis force (or Coriolis acceleration) or Coriolis effect, is originally named from a French physicist and mathematician, Gaspard de Coriolis (1792–1843), who postulated his acceleration in 1835 as a correction for the earth's rotation in ballistic trajectory calculations. The Coriolis acceleration acts on a body that is moving around a point with a fixed angular velocity and moving radially as well.

The basic equation defining Coriolis force is expressed as follows:

$$\vec{F}_{Coriolis} = m\vec{a}_{Coriolis} = 2m(\vec{\omega} \times \vec{V}_{Oscillation})$$

where $$\vec{F}_{Coriolis}$$

is the detected Coriolis force;
m is the mass of the inertial element;

$$\vec{a}_{Coriolis}$$

is the generated Coriolis acceleration;

$$\vec{\omega}$$

is the applied (input) angular rotation rate;

$$\vec{V}_{Oscillation}$$

is the oscillation velocity in a rotating frame.

The Coriolis force produced is proportional to the product of the mass of the inertial element, the input rotation rate, and the oscillation velocity of the inertial element that is perpendicular to the input rotation rate.

The major problems with micromachined vibrating type angular rate producer are insufficient accuracy, sensitivity, and stability. Unlike MEMS acceleration producers that are passive devices, micromachined vibrating type angular rate producer are active devices. Therefore, associated high performance electronics and control should be invented to effectively use hands-on micromachined vibrating type angular rate producers to achieve high performance angular rate measurements in order to meet the requirement of the micro IMU.

Therefore, in order to obtain angular rate sensing signals from a vibrating type angular rate detecting unit, a dither drive signal or energy must be fed first into the vibrating type angular rate detecting unit to drive and maintain the oscillation of the inertial elements with a constant momentum. The performance of the dither drive signals is critical for the whole performance of a MEMS angular rate producer.

Figure 20:
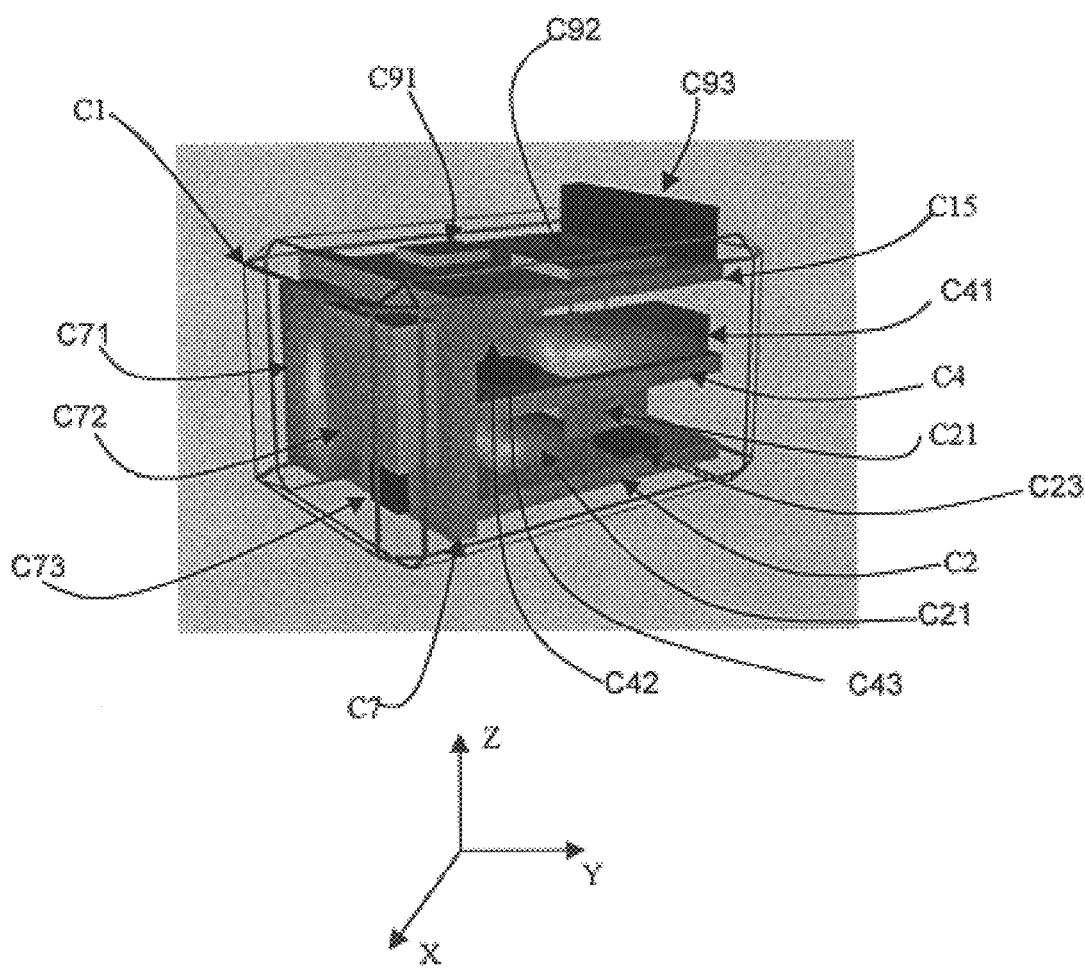
FIG. 20 is a perspective view illustrating the inside mechanical structure and circuit board deployment in the micro IMU according to the above preferred embodiment of the present invention.
Figure 21:
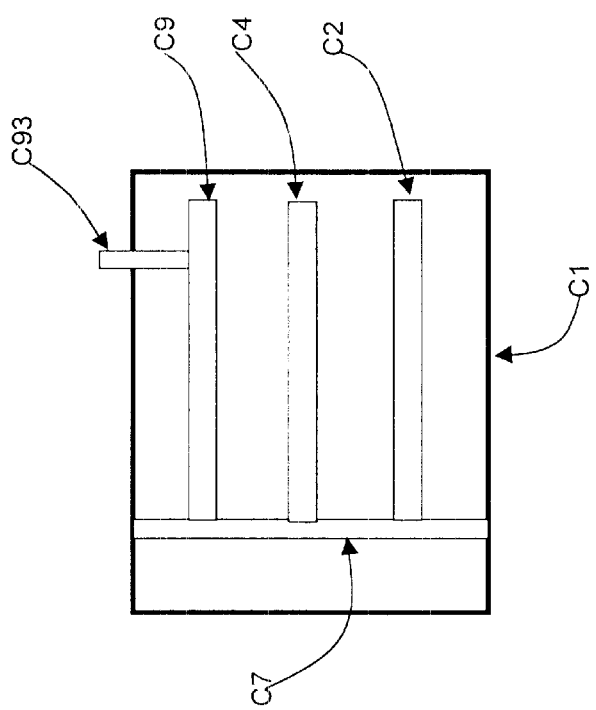
FIG. 21 is a sectional side view of the micro IMU according to the above preferred embodiment of the present invention.

As shown in FIG. 20 and FIG. 21, which are a perspective view and a sectional view of the micro IMU of the present invention as shown in the block diagram of FIG. 4, the micro IMU comprises a first circuit board c2, a second circuit board c4, a third circuit board c7, and a control circuit board c9 arranged inside a metal cubic case c1.

The first circuit board c2 is connected with the third circuit board c7 for producing X axis angular sensing signal and Y axis acceleration sensing signal to the control circuit board c9.

The second circuit board c4 is connected with the third circuit board c7 for producing Y axis angular sensing signal and X axis acceleration sensing signal to the control circuit board c9.

The third circuit board c7 is connected with the control circuit board c9 for producing Z axis angular sensing signal and Z axis acceleration sensing signals to the control circuit board c9.

The control circuit board c9 is connected with the first circuit board c2 and then the second circuit board c4 through the third circuit board c7 for processing the X axis, Y axis and Z axis angular sensing signals and the X axis, Y axis and Z axis acceleration sensing signals from the first, second and control circuit board to produce digital angular increments and velocity increments, position, velocity, and attitude solution.

Figure 22:
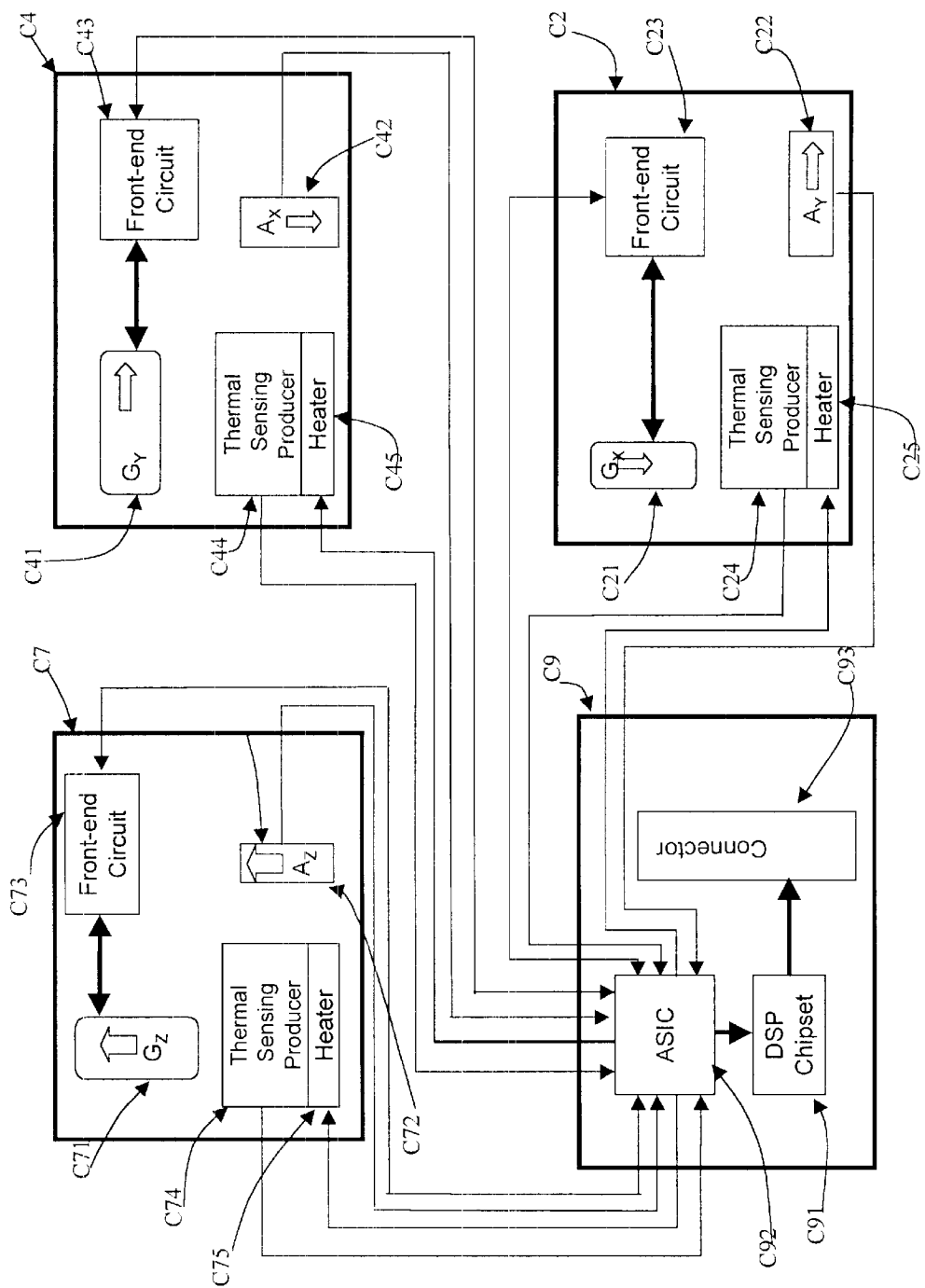
FIG. 22 is a block diagram illustrating the connection among the four circuit boards inside the micro IMU according to the above preferred embodiment of the present invention.
Figure 23:
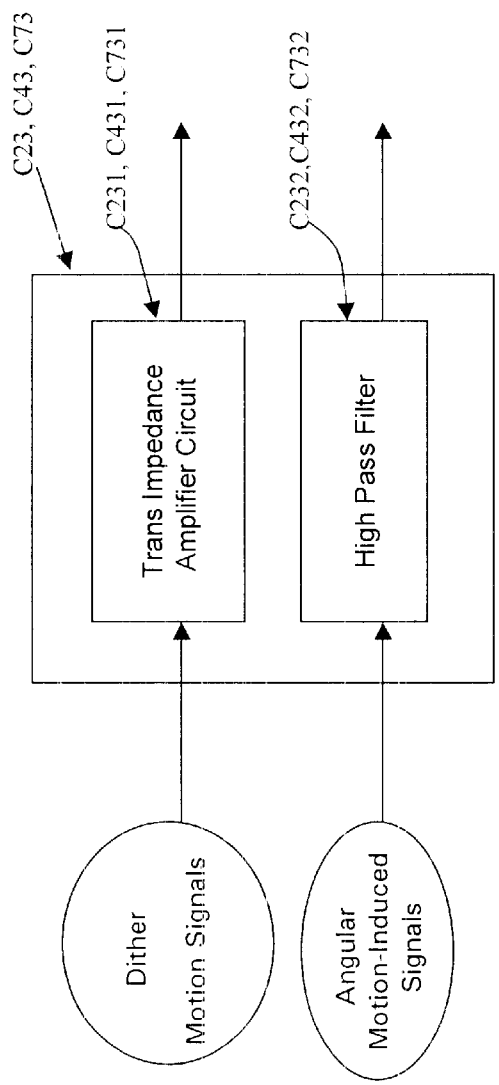
FIG. 23 is a block diagram of the front-end circuit in each of the first, second, and fourth circuit boards of the micro IMU according to the above preferred embodiment of the present invention.
Figure 24:
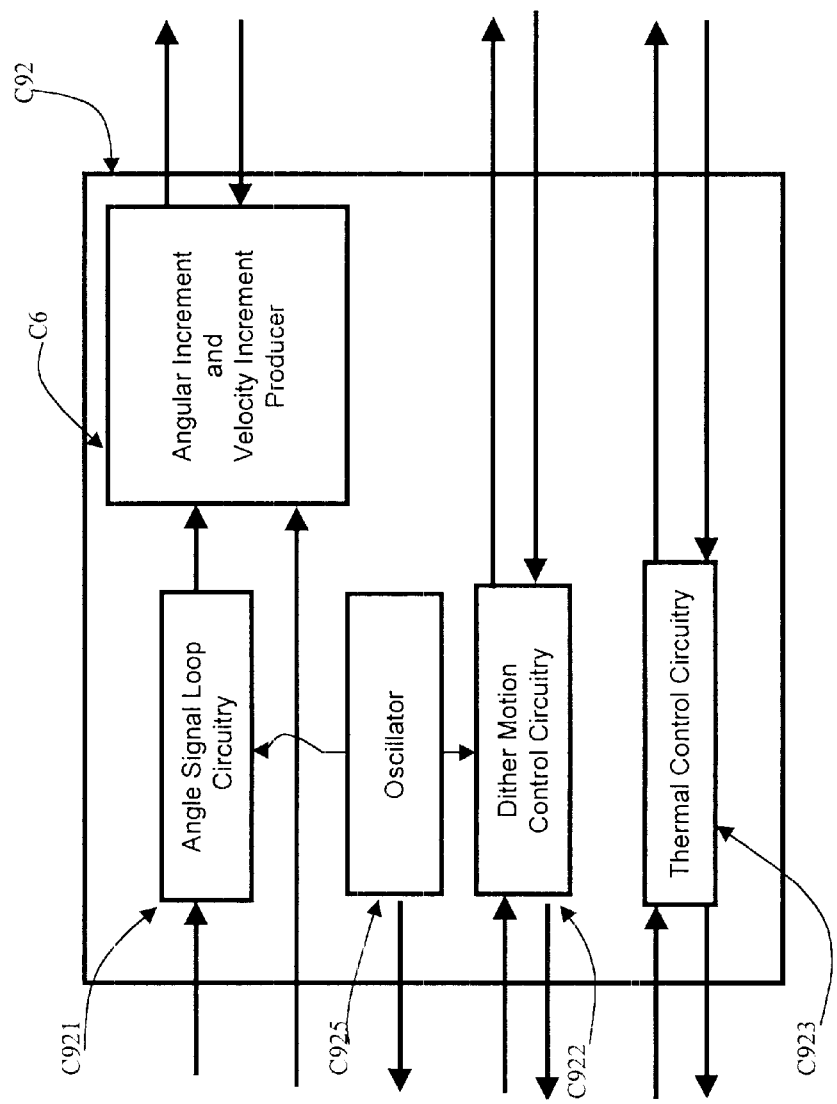
FIG. 24 is a block diagram of the ASIC chip in the third circuit board of the micro IMU according to the above preferred embodiment of the present invention.
Figure 25:
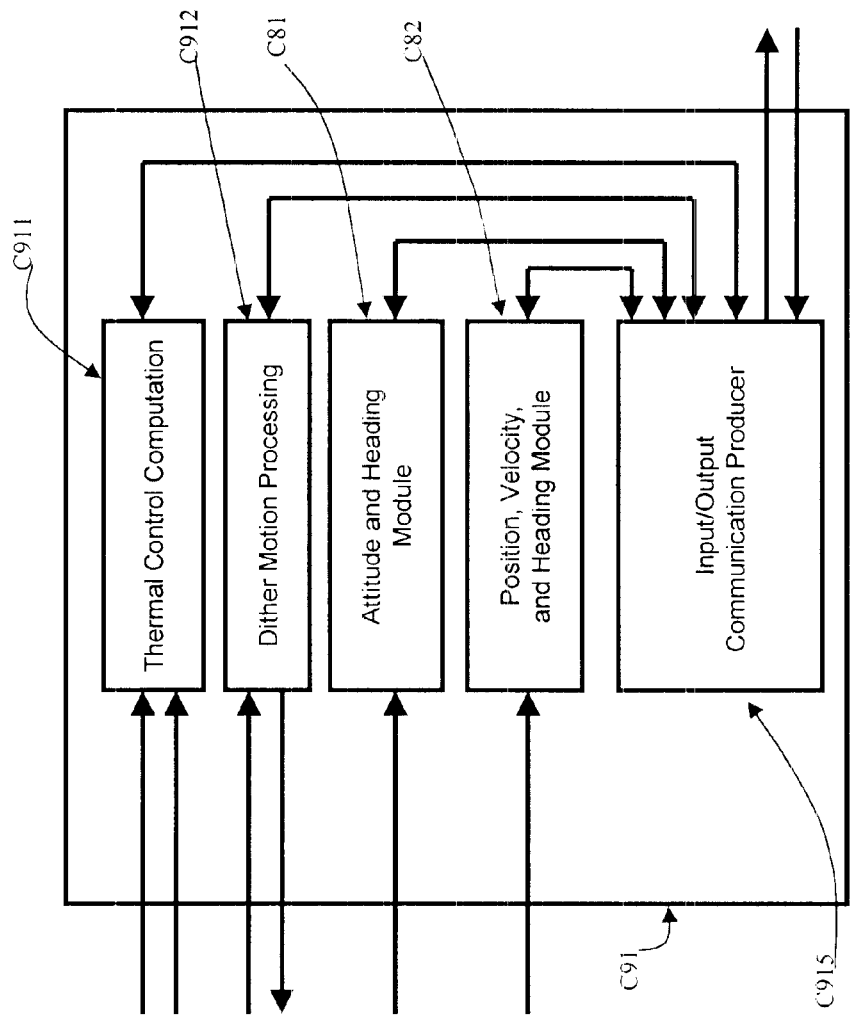
FIG. 25 is a block diagram of processing modules running in the DSP chipset in the third circuit board of the micro IMU according to the above preferred embodiment of the present invention.

As shown in FIG. 22, the angular producer c5 of the preferred embodiment of the present invention comprises:

an X axis vibrating type angular rate detecting unit c21 and a first front-end circuit c23 connected on the first circuit board c2;

a Y axis vibrating type angular rate detecting unit c41 and a second front-end circuit c43 connected on the second circuit board c4;

a Z axis vibrating type angular rate detecting unit c71 and a third front-end circuit c73 connected on the third circuit board c7;

three angular signal loop circuitries c921, which are provided in a ASIC chip c92 connected on the control circuit board c9, for the first, second and third circuit boards c2, c4, c7 respectively;

three dither motion control circuitries c922, which are provided in the ASIC chip c92 connected on the control circuit board c9, for the first, second and third circuit boards c2, c4, c7 respectively;

an oscillator c925 adapted for providing reference pickoff signals for the X axis vibrating type angular rate detecting unit c21, the Y axis vibrating type angular rate detecting unit c41, the Z axis vibrating type angular rate detecting unit c7 1, the angle signal loop circuitry c921, and the dither motion control circuitry c922; and three dither motion processing modules c912, which run in a DSP (Digital Signal Processor) chipset c91 connected on the control circuit board c9, for the first, second and third circuit boards c2, c4, c7 respectively.

The first, second and third front-end circuits c23, c43, c73, each of which is structurally identical, are used to condition the output signal of the X axis, Y axis and Z axis vibrating type angular rate detecting units c21, c41, c71 respectively and each further comprises:

a trans impedance amplifier circuit c231, c431, c731, which is connected to the respective X axis, Y axis or Z axis vibrating type angular rate detecting unit c21, c41, c71 for changing the output impedance of the dither motion signals from a very high level, greater than 100 million ohms, to a low level, less than 100 ohms to achieve two dither displacement signals, which are A/C voltage signals representing the displacement between the inertial elements and the anchor combs, wherein the two dither displacement signals are output to the dither motion control circuitry c922; and a high-pass filter circuit c232, c432, c732, which is connected with the respective X axis, Y axis or Z axis vibrating type angular rate detecting units c21, c41, c71 for removing residual dither drive signals and noise from the dither displacement differential signal to form a filtered dither displacement differential signal to the angular signal loop circuitry c921.

Each of the X axis, Y axis and Z axis angular rate detecting units c21, c41, and c71 is structurally identical except that sensing axis of each angular rate detecting unit is placed in an orthogonal direction. The X axis angular rate detecting unit c21 is adapted to detect the angular rate of the vehicle along X axis. The Y axis angular rate detecting unit c21 is adapted to detect the angular rate of the vehicle along Y axis. The Z axis angular rate detecting unit c21 is adapted to detect the angular rate of the vehicle along Z axis.

Each of the X axis, Y axis and Z axis angular rate detecting units c21, c41 and c71 is a vibratory device, which comprises at least one set of vibrating inertial elements, including tuning forks, and associated supporting structures and means, including capacitive readout means, and uses Coriolis effects to detect vehicle angular rate.

Each of the X axis, Y axis and Z axis vibrating type angular rate detecting units c21, c41, c71 receives signals as follows:

1) dither drive signals from the respective dither motion control circuitry c922, keeping the inertial elements oscillating; and
2) carrier reference oscillation signals from the oscillator c925, including capacitive pickoff excitation signals.

Each of the X axis, Y axis and Z axis vibrating type angular rate detecting units c21, c41, c71 detects the angular motion in X axis, Y axis and Z axis respectively of a vehicle in accordance with the dynamic theory (Coriolis force), and outputs signals as follows:

1) angular motion-induced signals, including rate displacement signals which may be modulated carrier reference oscillation signals to a trans Impedance amplifier circuit c231, c431, c731 of the first, second, and third front-end circuit c23; and
2) its inertial element dither motion signals, including dither displacement signals, to the high-pass filter c232, c432,c732 of the first, second, and third front-end circuit c23.

The three dither motion control circuitries c922 receive the inertial element dither motion signals from the X axis, Y axis and Z axis vibrating type angular rate detecting units c21, c41, c71 respectively, reference pickoff signals from the oscillator c925, and produce digital inertial element displacement signals with known phase.

Figure 27:
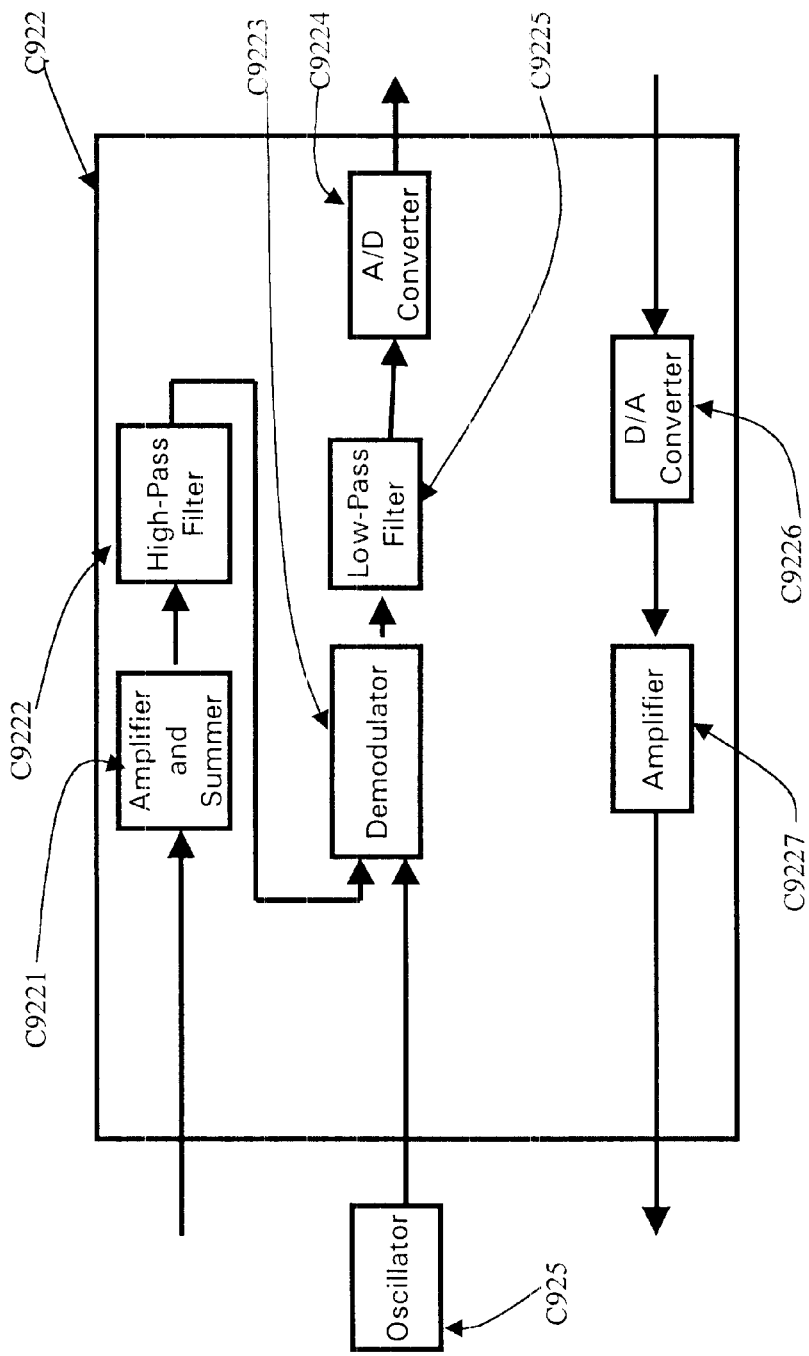
FIG. 27 is block diagram of the dither motion control circuitry of the ASIC chip in the third circuit board of the micro IMU according to the above preferred embodiment of the present invention.

In order to convert the inertial element dither motion signals from the X axis, Y axis and Z axis vibrating type angular rate detecting units c21, c41, c71 to processible inertial element dither motion signals, referring to FIG. 27, each of the dither motion control circuitries c922 comprises:

an amplifier and summer circuit c9221 connected to the trans impedance amplifier circuit c231, c431, c731 of the respective first, second or third front-end circuit c23, c43, c73 for amplifying the two dither;:displacement signals for more than ten times and enhancing the sensitivity for combining the two dither displacement signals to achieve a dither displacement differential signal by subtracting a center anchor comb signal with a side anchor comb signal;

a high-pass filter circuit c9222 connected to the amplifier and summer circuit c9221 for removing residual dither drive signals and noise from the dither displacement differential signal to form a filtered dither displacement differential signal;

a demodulator circuit c9223 connected to the high-pass filter circuit c2225 for receiving the capacitive pickoff excitation signals as phase reference signals from the oscillator c925 and the filtered dither displacement differential signal from the high-pass filter c9222 and extracting the in-phase portion of the filtered dither displacement differential signal to produce an inertial element displacement signal with known phase;

a low-pass filter c9225 connected to the demodulator circuit c9223 for removing high frequency noise from the inertial element displacement signal input thereto to form a low frequency inertial element displacement signal;

an analog/digital converter c9224 connected to the low-pass filter c9225 for converting the low frequency inertial element displacement analog signal to produce a digitized low frequency inertial element displacement signal to the dither motion processing module c912 (disclosed in the following text) running the DSP chipset c91;

a digital/analog converter c9226 processing the selected amplitude from the dither motion processing module c912 to form a dither drive signal with the correct amplitude; and an amplifier c9227 which generates and amplifies the dither drive signal to the respective X axis, Y axis or Z axis vibrating type angular rate detecting unit c21, c41, c71 based on the dither drive signal with the selected frequency and correct amplitude.

The oscillation of the inertial elements residing inside each of the X axis, Y axis and Z axis vibrating type angular rate detecting units c21, c41, c71 is generally driven by a high frequency sinusoidal signal with precise amplitude. It is critical to provide the X, axis, Y axis and Z axis vibrating type angular rate detecting units c21, c41, c71 with high performance dither drive signals to achieve keen sensitivity and stability of X-axis, Y-axis and Z axis angular rate measurements.

The dither motion processing module c912 receives digital inertial element displacement signals with known phase from the analog/digital converter c9224 of the dither motion control circuitry c922 for:

(1) finding the frequencies which have the highest Quality Factor (Q) Values,
(2) locking the frequency, and
(3) locking the amplitude to produce a dither drive signal, including high frequency sinusoidal signals with a precise amplitude, to the respective X axis, Y axis or Z axis vibrating type angular rate detecting unit c21, c41, c71 to keep the inertial elements oscillating at the pre-determined resonant frequency.

The three dither motion processing modules c912 is to search and lock the vibrating frequency and amplitude of the inertial elements of the respective X axis, Y axis or Z axis vibrating type angular rate detecting unit c21, c41, c71. Therefore, the digitized low frequency inertial element displacement signal is first represented in terms of its spectral content by using discrete Fast Fourier Transform (FFT).

Discrete Fast Fourier Transform (FFT) is an efficient algorithm for computing discrete Fourier transform (DFT), which dramatically reduces the computation load imposed by the DFT. The DFT is used to approximate the Fourier transform of a discrete signal. The Fourier transform, or spectrum, of a continuous signal is defined as:

$$X(j\omega) = \int_{-\infty}^{\infty} x(t)e^{-j\omega t}dt$$

The DFT of N samples of a discrete signals X(nT) is given by:

$$X_s(k\omega) = \sum_{n=0}^{N-1} x(nT)e^{-j\omega Tnk}$$

where ω=2π/NT, T is the inter-sample time interval. The basic property of FFT is its ability to distinguish waves of different frequencies that have been additively combined.

After the digitized low frequency inertial element displacement signals are represented in terms of their spectral content by using discrete Fast Fourier Transform (FFT), Q (Quality Factor) Analysis is applied to their spectral content to determine the frequency with global maximal Q value. The vibration of the inertial elements of the respective X axis, Y axis or Z axis vibrating type angular rate detecting unit c21, c41, c71 at the frequency with global maximal Q value can result in minimal power consumption and cancel many of the terms that affect the excited mode. The Q value is a function of basic geometry, material properties, and ambient operating conditions.

A phase-locked loop and digital/analog converter is further used to control and stabilize the selected frequency and amplitude.

Figure 29:
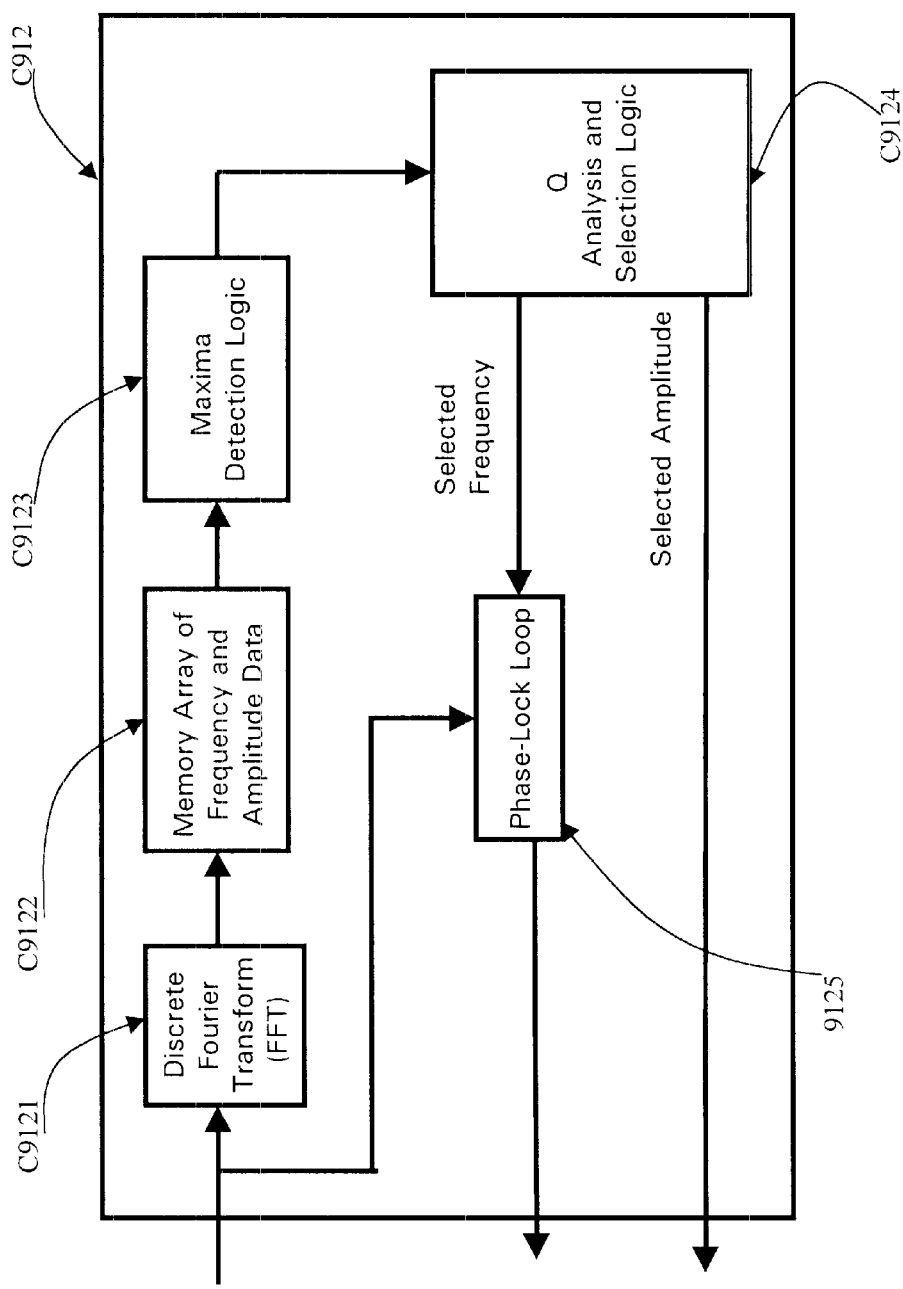
FIG. 29 is a block diagram of the dither motion processing module running in the DSP chipset of the third circuit board of the micro IMU according to the above preferred embodiment of the present invention.

Referring to FIG. 29, the dither motion processing module c912 further includes a discrete Fast Fourier Transform (FFT) module c9121, a memory array of frequency and amplitude data module c9122, a maxima detection logic module c9123, and a Q analysis and selection logic module c9124 to find the frequencies which have the highest Quality Factor (Q) Values.

The discrete Fast Fourier Transform (FFT) module c9121 is arranged for transforming the digitized low frequency inertial element displacement signal from the analog/digital converter c9224 of the dither motion control circuitry c922 to form amplitude data with the frequency spectrum of the input inertial element displacement signal.

The memory array of frequency and amplitude data module c9122 receives the amplitude data with frequency spectrum to form an array of amplitude data with frequency spectrum.

The maxima detection logic module c9123 is adapted for partitioning the frequency spectrum from the array of the amplitude data with frequency into plural spectrum segments, and choosing those frequencies with the largest amplitudes in the local segments of the frequency spectrum.

The Q analysis and selection logic module c9124 is adapted for performing Q analysis on the chosen frequencies to select frequency and amplitude by computing the ratio of amplitude/bandwidth, wherein the range for computing bandwidth is between +−1/2 of the peek for each maximum frequency point.

Moreover, the dither motion processing module c912 further includes a phase-lock loop c9125 to reject noise of the selected frequency to form a dither drive signal with the selected frequency, which serves as a very narrow bandpass filter, locking the frequency.

Figure 26:
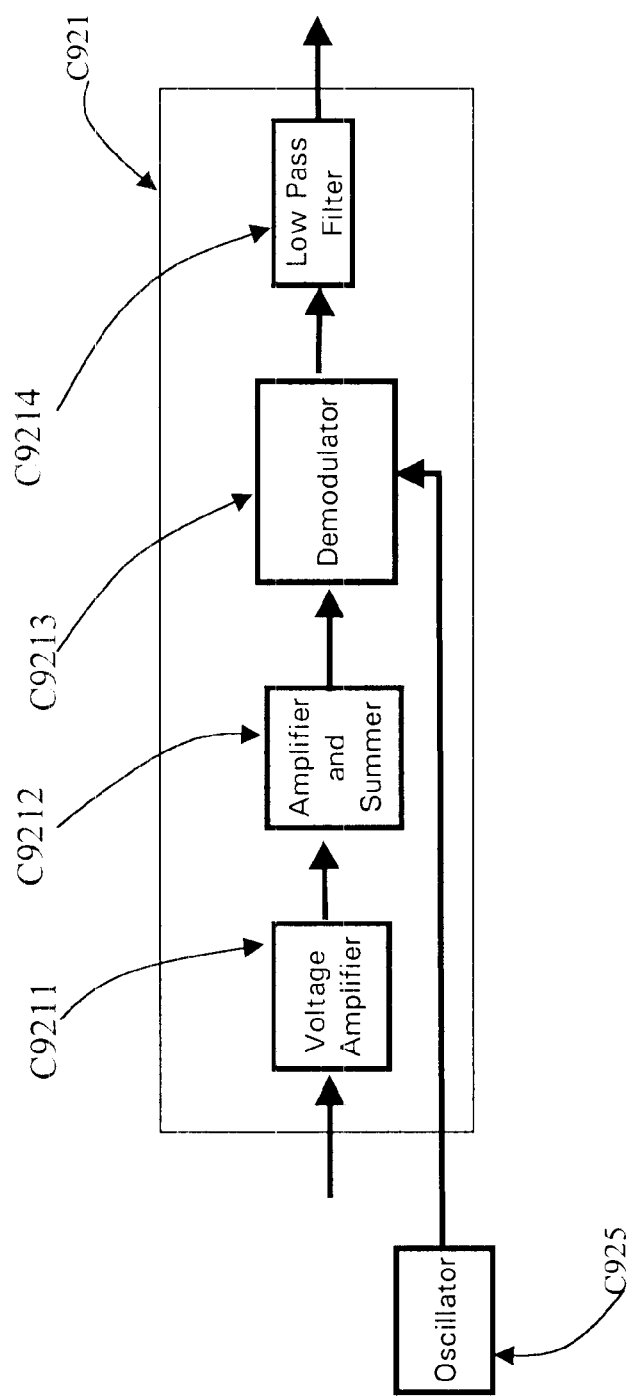
FIG. 26 is a block diagram of the angle signal loop circuitry of the ASIC chip in the third circuit board of the micro IMU according to the above preferred embodiment of the present invention.

The three angle signal loop circuitries c921 receive the angular motion-induced signals from the X axis, Y axis and Z axis vibrating type angular rate detecting units c21, 20 c41, c71 respectively and reference pickoff signals from the oscillator c925, and transform the angular motion-induced signals into angular rate signals. Referring to FIG. 26, each of the angle signal loop circuitries c921 for the respective first, second or third circuit board c2, c4, c7 comprises:

- a voltage amplifier circuit c9211, which amplifies the filtered angular motion-induced signals from the high-pass filter circuit c232 of the respective first, second or third front-end circuit c23, c43, c73 to an extent of at least 100 milivolts to form amplified angular motion-induced signals;
- an amplifier and summer circuit c9212, which subtracts the difference between the angle rates of the amplified angular motion-induced signals to produce a differential angle rate signal;
- a demodulator c9213, which is connected to the amplifier and summer circuit c9212, extracting the amplitude of the in-phase differential angle rate signal from the differential angle rate signal and the capacitive pickoff excitation signals from the oscillator c925; and
- a low-pass filter c9214, which is connected to the demodulator c9213, removing the high frequency noise of the amplitude signal of the in-phase differential angle rate signal to form the angular rate signal output to the angular increment and velocity increment producer c6.

Figure 13:
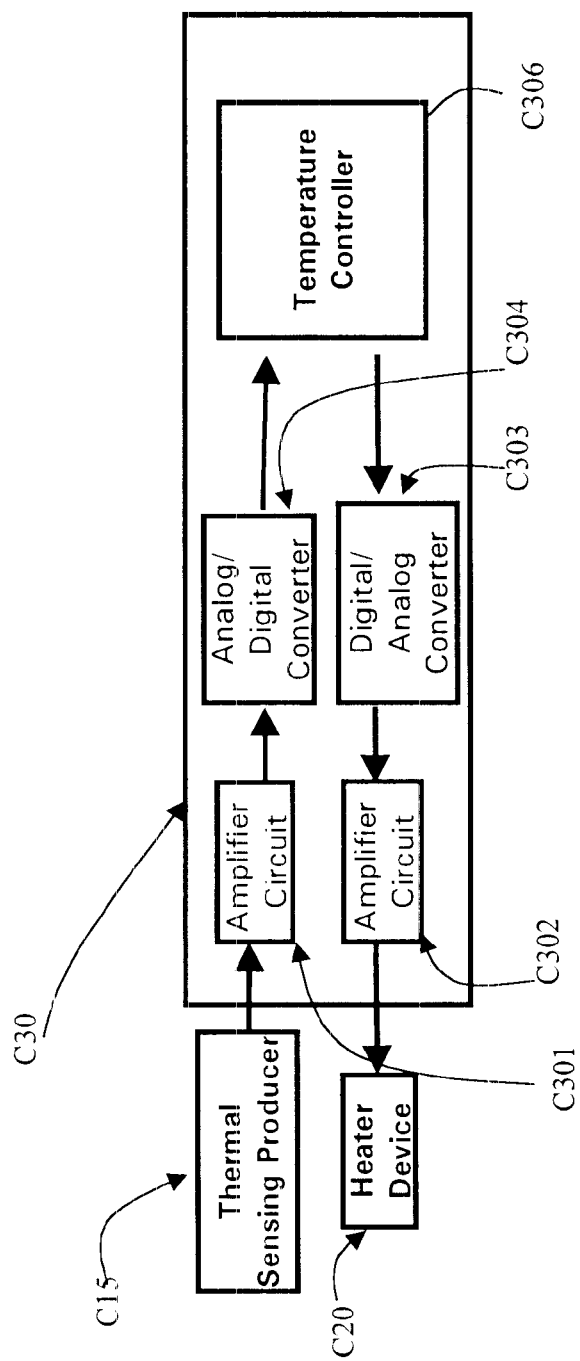
FIG. 13 is a block diagram illustrating another thermal processor for outputting analog voltage signals of the thermal sensing producer according to the above preferred embodiment of the present invention.

Referring to FIGS. 13 to 15, the acceleration producer c10 of the preferred embodiment of the present invention comprises:

- a X axis accelerometer c42, which is provided on the second circuit board c4 and connected with the angular increment and velocity increment producer 6 provided in the AISC chip c92 of the control circuit board c9;
- a Y axis accelerometer c22, which is provided on the first circuit board c2 and connected with angular increment and velocity increment producer c6 provided in the AISC chip c92 of the control circuit board c9; and
- a Z axis accelerometer c72, which is provided on the third circuit board 7 and connected with angular increment and velocity increment producer 6 provided in the AISC chip c92 of the control circuit board c9.

Referring to FIGS. 5, 21 and FIG. 22, thermal sensing producer device c15 of the preferred embodiment of the present invention further comprises:

- a first thermal sensing producing unit c24 for sensing the temperature of the X axis angular rate detecting unit c21 and the Y axis accelerometer c22;
- a second thermal sensing producer c44 for sensing the temperature of the Y axis angular rate detecting unit c41 and the X axis accelerometer c42; and
- a third thermal sensing producer c74 for sensing the temperature of the Z axis angular rate detecting unit c71 and the Z axis accelerometer c72.

Referring to FIGS. 5 and 22, the heater device c20 of the preferred embodiment of the present invention further comprises:

- a first heater c25, which is connected: to the X axis angular rate detecting unit c21, the Y axis accelerometer c22, and the first front-end circuit c23, for maintaining the predetermined operational temperature of the X axis angular rate detecting unit c21, the Y axis accelerometer c22, and the first front-end circuit c23;
- a second heater c45, which is connected to the Y axis angular rate detecting unit c41, the X axis accelerometer c42, and the second front-end circuit c43, for maintaining the predetermined operational temperature of the X axis angular rate detecting unit c41, the X axis accelerometer c42, and the second front-end circuit c43; and
- a third heater c75, which is connected to the Z axis angular rate detecting unit c71, the Z axis accelerometer c72, and the third front-end circuit c73, for maintaining the predetermined operational temperature of the Z axis angular rate detecting unit c71, the Z axis accelerometer c72, and the third front-end circuit c73.

Referred to FIGS. 5, 14, 15, 24, and 25, the thermal processor c30 of the preferred embodiment of the present invention further comprises three identical thermal control circuitries c923 and the thermal control computation modules c91 running the DSP chipset c91.

Figure 28:
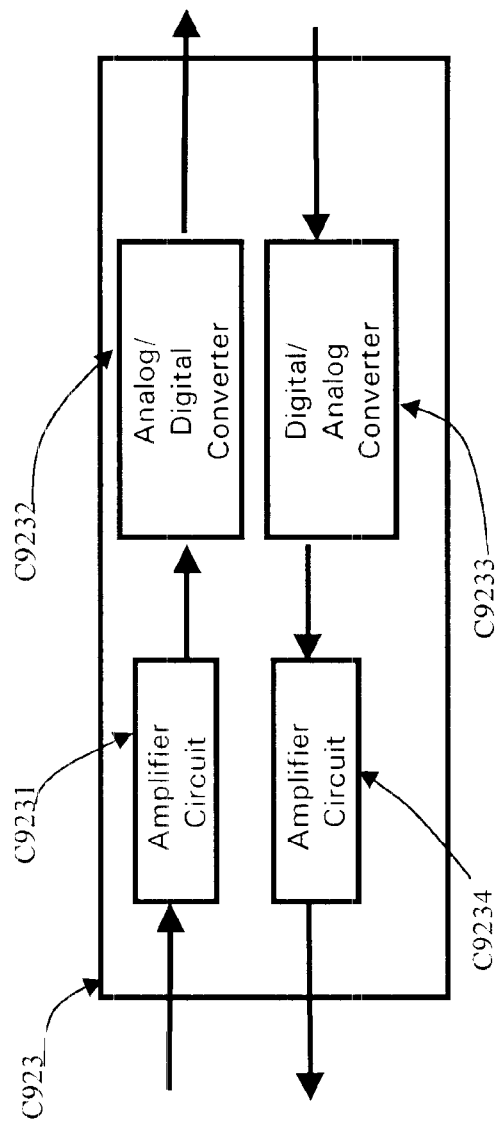
FIG. 28 is a block diagram of the thermal control circuit of the ASIC chip in the third circuit board of the micro IMU according to the above preferred embodiment of the present invention.

As shown in FIGS. 22 and 28, each of the thermal control circuitries c923 further comprises:

a first amplifier circuit c9231, which is connected with the respective X axis, Y axis or Z axis thermal sensing producer c24, c44, c74, for amplifying the signals and suppressing the noise residing in the temperature voltage signals from the respective X axis, Y axis or Z axis thermal sensing producer c24, c44, c74 and improving the signal-to-noise ratio;

an analog/digital converter c9232, which is connected with the amplifier circuit c9231, for sampling the temperature voltage signals and digitizing the sampled temperature voltage signals to digital signals, which are output to the thermal control computation module c911;

a digital/analog converter c9233 which converts the digital temperature commands input from the thermal control computation module c911 into analog signals; and a second amplifier circuit c9234, which receives the analog signals from the digital/analog converter 9233, amplifying the input analog signals from the digital/analog converter c9233 for driving the respective first, second or third heater c25, c45, c75; and closing the temperature controlling loop.

The thermal control computation module c911 computes digital temperature commands using the digital temperature voltage signals from the analog/digital converter c9232, the temperature sensor scale factor, and the pre-determined operating temperature of the angular rate producer and acceleration producer, wherein the digital temperature commands are connected to the digital/analog converter c9233.

Figure 16:
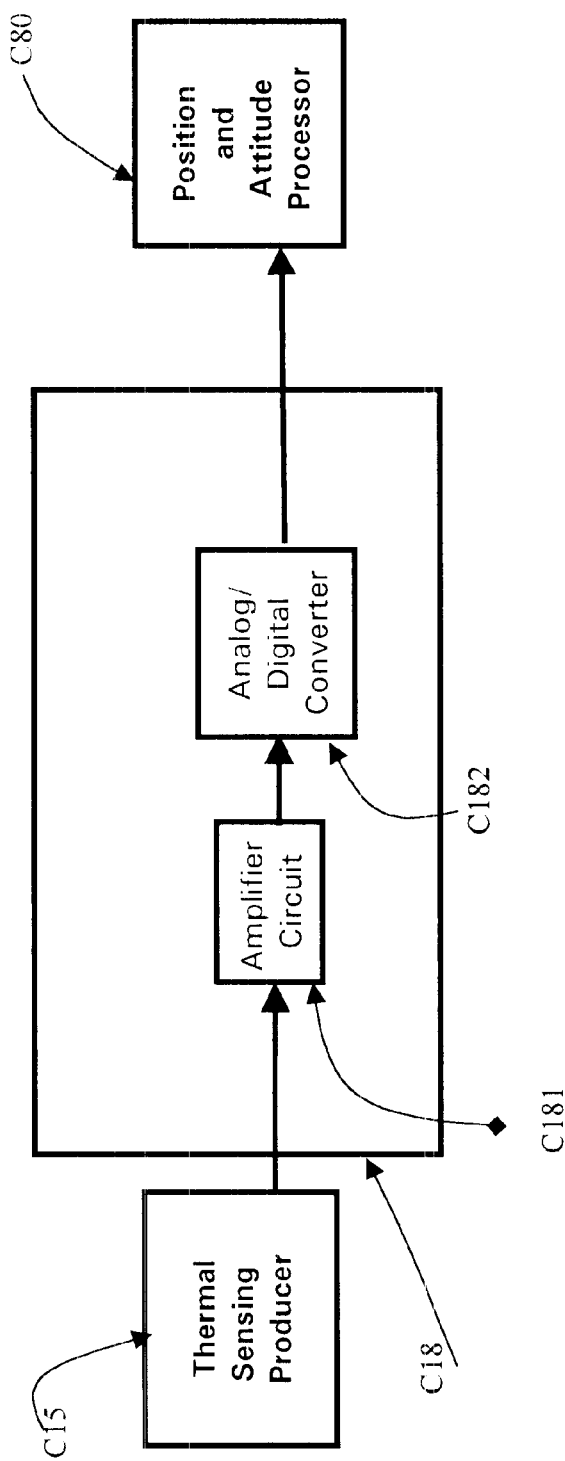
FIG. 16 is a block diagram illustrating a temperature digitizer for outputting analog voltage signals of the thermal sensing producer according to the above preferred embodiment of the present invention.

In order to achieve a high degree of full functional performance for the micro IMU, a specific package of the first circuit board c2, the second circuit board c4, the third circuit board c7, and the control circuit board c9 of the preferred embodiment of the present invention is provided and disclosed as follows:

In the preferred embodiment of the present invention, as shown in FIGS. 20, 16, and 17, the third circuit board c7 is bonded to a supporting structure by means of a conductive epoxy, and the first circuit board c2, the second circuit board c4, and the control circuit board c9 are arranged in parallel to bond to the third circuit board c7 perpendicularly by a non conductive epoxy.

In other words, the first circuit board c2, the second circuit board c4, and the control circuit board c9 are soldered to the third circuit board c7 in such a way as to use the third circuit board c7 as an interconnect board, thereby avoiding the necessity to provide interconnect wiring, so as to minimize the small size.

The first, second, third, and control circuit boards c2, c4, c7, and c9 are constructed using ground planes which are brought out to the perimeter of each circuit board c2, c4, c7, c9, so that the conductive epoxy can form a continuous ground plane with the supporting structure. In this way the electrical noise levels are minimized and the thermal gradients are reduced. Moreover, the bonding process also reduces the change in misalignments due to structural bending caused by acceleration of the IMU.

Referring to FIGS. 1, 2, 3, and 9, the amplifying means c660 is preferably embodied as an array of the angular rate amplifier 4 of the present invention. The angular rate producer c5 provides three-axis angular rate voltage signals. Therefore, the array of the angular rate amplifier 4 includes three individual angular rate amplifier 4 of the present invention.

Figure 30:
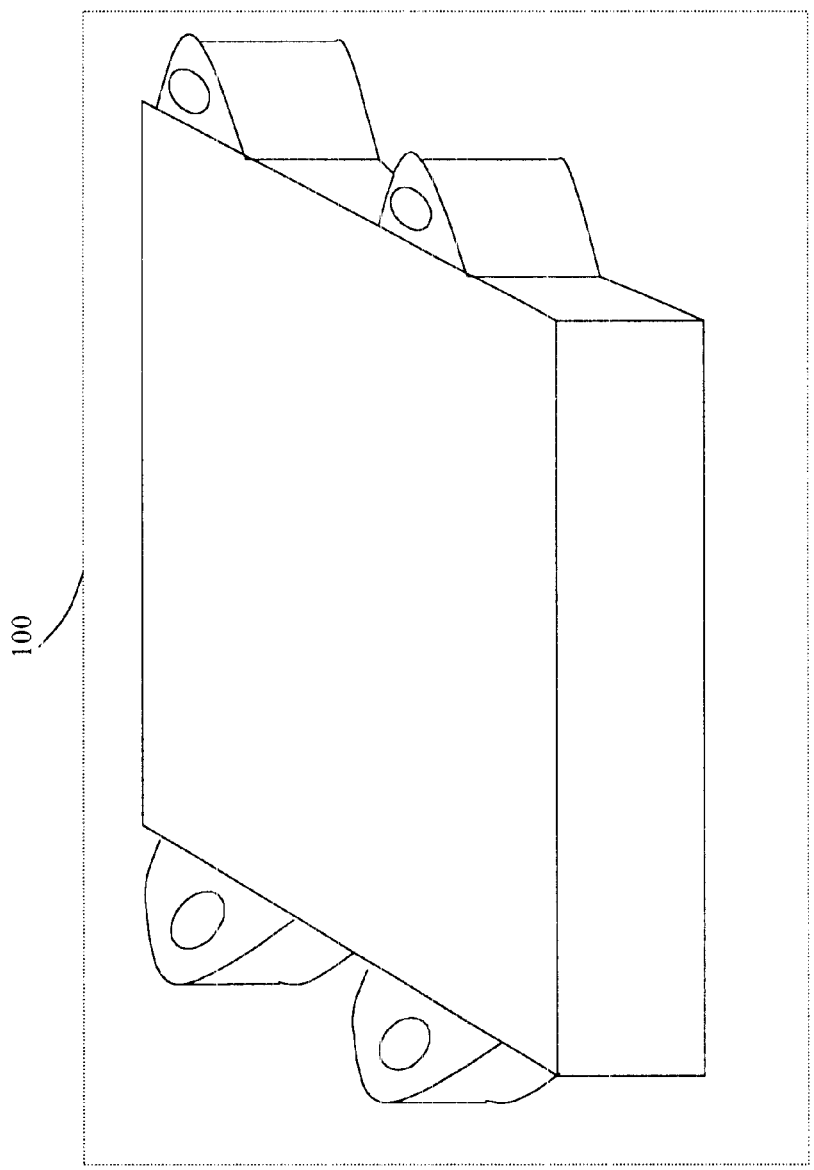
FIG. 30 is a block diagram of the shock isolator of the micro IMU of the present invention.
Figure 31:
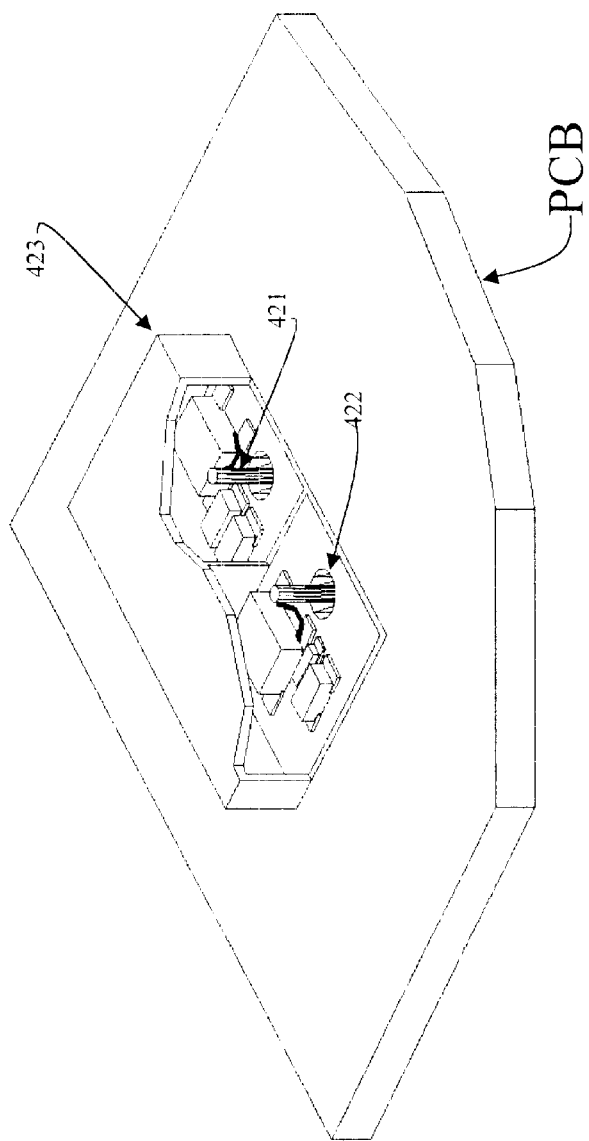
FIG. 31 is a perspective view illustrating the noise shield according to the above preferred embodiment of the present invention.

Referring to FIG. 30, the micro IMU of the present invention is installed in a carrier through a shock isolator 100 to resist shock and vibration. The shock isolator 100 can be made of rubber.

What is claimed is:

1. An angular rate amplifier for an angular rate producer having an output pin, comprising a noise shield, wherein said angular rate amplifier and said noise shield are designed on a printed circuit board (PCB) which has a ground plane, wherein said noise shield further comprises:

a central pin which is connected to said output pin of said angular rate producer and a user of said angular rate producer to carry an output signal of said angular rate producer;

a guard hole which is connected with said ground plane of said PCB to prevent any external noises and interference from being input into said output signal of said angular rate producer; and a guard hat, which is connected with said ground plane of said PCB, surrounding said central pin and said guard hole to further prevent noises and interference from being input into said output signal of said angular rate producer.

2. An angular rate amplifier for an angular rate producer having an output pin, comprising a co-resident trans impedance amplifier having an input point, and a noise shield which is placed between said output pin of said angular rate producer and said co-resident trans impedance amplifier to prevent any external noises and interference from being input into an output signal of said angular rate producer, wherein said noise shield is designed on a printed circuit board (PCB) and further comprises:

a central pin which one end of said central pin is connected with said output pin of said angular rate producer and another end of said central pin is connected with said input point of said co-resident trans impedance amplifier to further amplify useful signals, a guard hole which is connected with a ground plane of said PCB to prevent said external noises and interference from being input into said output signal of said angular rate producer, and said guard hat, which is connected with said ground plane of said PCB, surrounding said central pin and said guard hole to further prevent noises and interference from being input into said output signal of said angular rate producer.

* * * * *